United States Patent
Wu et al.

(10) Patent No.: US 7,951,310 B2
(45) Date of Patent: May 31, 2011

(54) NANOPHASE CARBON BLACK GRAFTED WITH ORGANIC COMPOUND IN SITU

(75) Inventors: Chifei Wu, Shanghai (CN); Xuanquan Zhou, Shanghai (CN); Weihong Guo, Shanghai (CN); Xiliang Zhang, Shanghai (CN); Guozhang Wu, Shanghai (CN); Haiyan Xu, Shanghai (CN); Xianhui Li, Shanghai (CN); Jianfeng Huang, Shanghai (CN); Na Yu, Shanghai (CN); Shengying Qian, Shanghai (CN); Jing Chen, Shanghai (CN); Liang Fang, Shanghai (CN); Fei Shen, Shanghai (CN); Li Lang, Shanghai (CN); Qiuying Zhang, Shanghai (CN); Jingjie Han, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 297 days.

(21) Appl. No.: 11/390,621

(22) Filed: Mar. 28, 2006

(65) Prior Publication Data
US 2007/0235692 A1 Oct. 11, 2007

(51) Int. Cl.
*H01B 1/06* (2006.01)
*H01B 1/12* (2006.01)
(52) U.S. Cl. ........ 252/511; 252/502; 252/510; 106/472; 106/478; 428/402.24; 428/403; 428/407; 525/326.5; 525/326.7; 525/327.5; 525/330.7
(58) Field of Classification Search .................. 252/500, 252/502, 510, 511; 525/326.1, 327.3, 326.5, 525/326.7, 327.5, 330.7; 428/402.24, 403, 407; 106/472, 478
See application file for complete search history.

(56) References Cited

U.S. PATENT DOCUMENTS

| 3,557,040 A | 1/1971 | Takashina et al. | |
|---|---|---|---|
| 4,530,961 A | 7/1985 | Ngyuen et al. | |
| 5,952,429 A * | 9/1999 | Ikeda et al. | 525/326.1 |
| 6,417,283 B1 * | 7/2002 | Ikeda et al. | 525/326.1 |
| 6,471,763 B1 * | 10/2002 | Karl | 106/478 |
| 2005/0034629 A1 * | 2/2005 | Belmont et al. | 106/31.6 |
| 2005/0120914 A1 * | 6/2005 | Momose et al. | 106/31.65 |

FOREIGN PATENT DOCUMENTS

JP 200554043 * 3/2005

OTHER PUBLICATIONS

Carbon Black Association. "Handbook of Carbon Black." 3rd edition. Apr. 2005.*

* cited by examiner

*Primary Examiner* — Mark Kopec
*Assistant Examiner* — Tri V Nguyen
(74) *Attorney, Agent, or Firm* — Hamre, Schumann, Mueller & Larson, P.C.

(57) ABSTRACT

The present invention discloses a nanophase carbon black grafted with organic compounds, comprising (a) a first component: 100 parts by weight of original carbon black particles, and (b) a second component: 5-300 parts by weight of grafting organic compounds having or producing free radicals which is grafted onto the surface of the carbon black, wherein the molecular weight of the grafting organic compounds is 100-10000, and the nanophase carbon black has a particle size of 1-100 nm. The invention also discloses the synthesis thereof and articles therefrom.

7 Claims, 6 Drawing Sheets

Original Carbon Black

Grafted Carbon Black

Grafted Carbon Black          Original Carbon Black

NANOPHASE CARBON BLACK GRAFTED WITH ORGANIC COMPOUND IN SITU

FIELD OF THE INVENTION

The present invention relates to surface modification on a carbon black which is used widely in the fields of rubber industry, plastics industry, printing ink, coating and dry battery, to raise its dispersibility in the polymer matrix or organic solvents and compatibility with dispersive mediums, to give it a variety of functions such as photosensitivity, heat sensitivity, gas sensitivity, biological activity, crosslinking ability, hydrophilicity and lipophilicity, to improve the performance of its composites in mechanical property, electric property, optical property and anti-electromagnetic irradiation property. The invention also relates to articles made from the nanophase carbon black.

BACKGROUND OF THE INVENTION

Carbon black is widely used in the fields of rubber, plastics for its properties in enhancement, function giving, improvement of processability and increment effect. Carbon black is rarely used in powder form or in grain form but in even dispersion among solid substances such as polymer matrix as rubbers, plastics or fibres, or liquid substances such as water or organic solvents. But the performance of carbon black is limited for the reason that carbon black particle is difficult to disperse evenly in polymer matrix, water or organic solvents for its specific surface area is very large so as to coagulating easily, and carbon black as inorganic filler is difficult to be compatible with organic substances such as polymers or solvents. In another aspect, along with rapid development of the nano-technology and the information technology, the requirements of carbon black are growing on its dispersion in polymer matrix, water or organic solvents and its compatibility with polymer matrix, water or organic solvents.

Sometimes carbon black is required to be modified to make full use of its properties or to improve the performance of carbon black/polymer composite or carbon black dispersion such as coatings. Methods of surface modification on carbon black which are well known include oxidation, surfactant treatment, polymeric dispersant treatment and surface grafting modification, of which the surface grafting modification is the most effective way.

Carbon black surface grafting modification which has developed in recent 40 years is an important means of chemical modification to improve the dispersibility and compatibility of carbon black. According to previous research results, it was found that surface grafting modification on carbon black may improve its dispersibility in polymer matrix or organic solvents and compatibility among dispersive mediums, may give it various functions such as photosensitivity, heat sensitivity, gas sensitivity, biological activity, crosslinking ability, hydrophilicity and lipophilicity, and may improve the performance of its composites in mechanical property, electric property, optical property and anti-electromagnetic radiation property. Therefore, the grafting modification on the surface of carbon black has been a concern of the research of rubber industry.

The research on grafted carbon black launched in 50s' of twentieth century, of which the subject concerns the mechanism of rubber reinforcement with carbon black. After 40 years' research, various methods of the surface grafting modification on carbon black has been developed, which can be classified into 3 types as follows:

(1) grafting onto the surface of carbon black: capturing the increasing polymeric chains by free radicals, anion radicals or cation radicals on the surface of carbon black and accordingly connecting them to the surface of carbon black (as disclosed in JP Sho 42-22047, Sho 44-3826, Sho 45-17248, Sho 46-26970, Hei 6-263830, U.S. Pat. Nos. 3,557,040, 4,530,961, etc);

(2) grafting from the surface of carbon black by polymerization: forming peroxidating radicals on the surface of carbon black by introducing active radicals thereon or by treatments such as discharge, ultraviolet treatment, ozonization, to initiate polymerization of monomer compound(s) as disclosed in JP Hei 6-25573, JP publication No. 2003-64279, 2003-41149, etc in which the polymerization can be divided into 3 types: free radical polymerization, anion polymerization, cation polymerization.

(3) carbon black reacting with functional polymeric compound(s): functional groups on the surface of carbon black reacting with functional polymeric compound as disclosed in JP Hei 2-24868, JP Hei 6-27269, JP publication No. 2000-154327, U.S. Pat. No. 5,952,429, etc. The reaction can further be divided in to 2 types: the reaction between active carbon black and polymeric compound(s) having hydroxyl group(s) or amino group(s), or the reaction between carbon black having carboxyl group(s) or phenolic hydroxyl group(s) on its surface with functional polymeric compound with active terminal(s).

It attracts attention from many manufactures for carbon black is suitable for ink, coating, nanophase materials and gas sensors after surface modification by polymer grafting. But there are certain defects existing in all these surface grafting reaction of carbon black. First, all the 3 types of above mentioned grafting modification on the surface of carbon black are performed in solution system, which may result in negative effects such as unfavorable for scale production, too costly, easy to pollute environment. Second, it's uneasy to control the structure of the modification layer of carbon black, whether directly grafting of polymeric chains onto the surface of carbon black or polymerizing of monomers which have been grafted onto the surface of carbon black. When directly grafting of polymeric chains onto the surface of carbon black, the grafting ratio is low because of the comparatively low reactivity and great steric hindrance of polymeric chains; in another aspect, when polymerizing of monomers which have been grafted onto the surface of carbon black, the processes of synthesis take more steps and the molecular weight of grafting polymer is hard to control in spite of higher grafting ratio. Though the reaction of carbon black and polymer in method (3) may graft specified polymer and can easily control the molecular weight and the chain number of grafted polymer on the surface of carbon black, there are limitations that, the polymer which can react with carbon black is limited to polymer having hydroxyl group, amino group or epoxy group, and the carbon black is limited to channel black having more oxygenic functional group on the surface instead of dissatisfying furnace black having less oxygenic functional group on the surface which is the main part of carbon black (about 90%). Third, all kinds of grafting modification of polymer are preformed in solution system, unable to obtain monodispersive primary particles, and even supersonic wave can not destroy the aggregate structure.

To sum up, it's hard to obtain monodispersive nanophase carbon black which can disperses evenly in polymeric matrix, water or organic solvents following the prior art.

After summary of all the problems above, the invention is brought forward. The objects of this invention are, to provide a nanophase carbon black produced by in situ grafting with organic compound(s), having good dispersibility in polymer matrix or organic solvents and good compatibility with dispersive mediums, whose size can be strictly controlled and able to form a stable dispersion in polymer matrix or organic solvents; to provide a synthesis method which is simple, cheap and pollution-free; and to provide articles made therefrom.

DISCLOSURE OF THE INVENTION

The inventors took an intensive research to solve the above problems in prior art to achieve the objects of the present invention. As a result, it was found that there are oxygenic functional groups on the surface of carbon black such as carboxyl group, quinonyl group, and lactonic group; and active hydrogen atoms, all of which are quite active free radicals or can be transformed into such radicals, which can carry out free radical termination if there are other active free radicals around the carbon black particles. The other free radical around the carbon particles, being able to capture free radicals, may originate from antioxidants, such as the phenols with steric hindrance, the aromatic secondary amines and the derivatives thereof, the phosphates, the thioethers, etc., light stabilizers, such as the amines with steric hindrance, the phenols etc. and other organic compounds which may be broken into the free radicals under external action such as heat or the mechanical shearing force, etc. On the other hand, the carbon black is able to capture the free radicals. And, organic compounds containing free radicals may be obtained from the antioxidants, such as the phenols with steric hindrance, the aromatic secondary amines and the derivatives thereof, the phosphates, the thioethers; the amines with steric hindrance; the phenols; the azocompounds; the peroxides; the vulcanizers and vulcanization accelerators; fire retardants or any other commercially available small molecular organic compounds, oligomers and polymers by their breakage under heat, mechanical shearing force, upon exposure in electromagnetic wave radiation such as ultrasonic wave, microwave, ultraviolet and infrared; and upon exposure in ozone, or any other oxidants. Carbon black aggregates may be destroyed to form primary particles under vigorous shearing force, to get the nanophase carbon black grafted with the organic compounds of the invention and the method thereof.

The nanophase carbon black of the present invention, which is grafted in situ with organic compounds, graft the organic compounds having or producing free radicals onto the surface of carbon black, unnecessary to add active initiators such as benzoperoxide (PBO), azodiisobutyronitrile (AIBN), or add compounds such as oxy-ester group, azo group, redox agent, OLi group, alkali carboxylate, amino group, acyl carboxyl perchloride to introduce various active functional groups onto the surface of carbon black, likewise, unnecessary to treat the surface of carbon black to form active functional group such as peroxide group by discharge, ultraviolet treatment, ozone treatment.

The following describes the present invention in details.

BRIEF DESCRIPTIONS OF THE FIGURES

Figure 1:
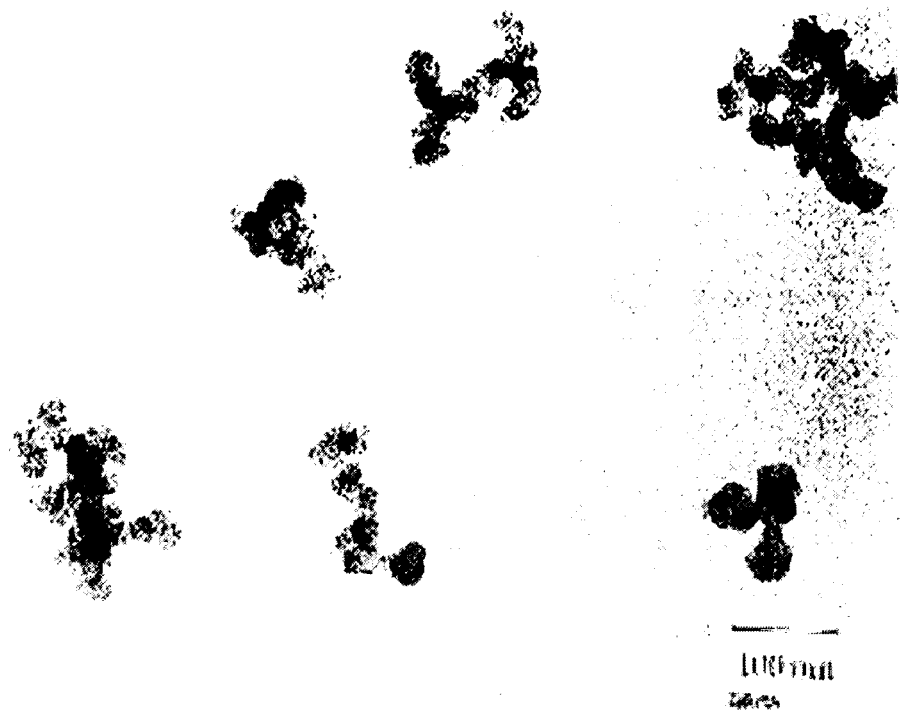
FIG. 1 is a transmission electronic micrograph of carbon black
Figure 2:
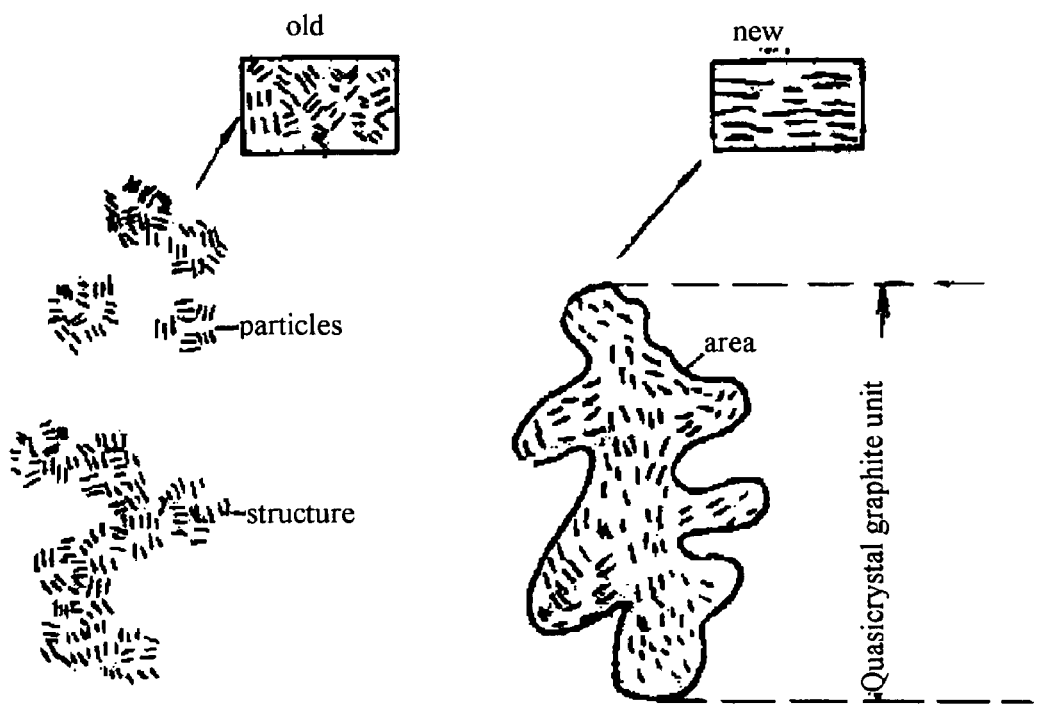
FIG. 2 is a schematic plan of structural model of carbon black
Figure 3:
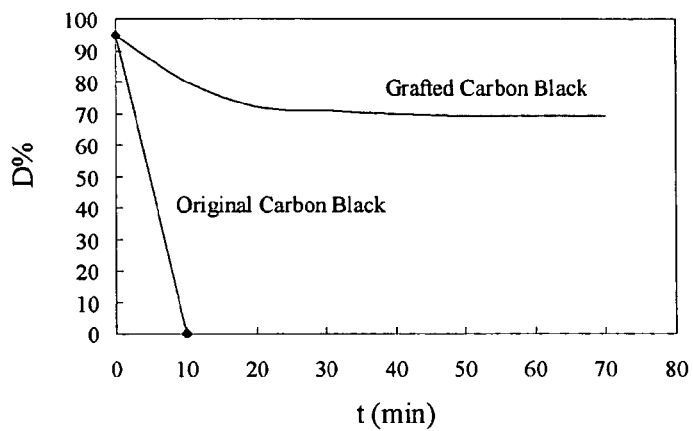
Figure 4:
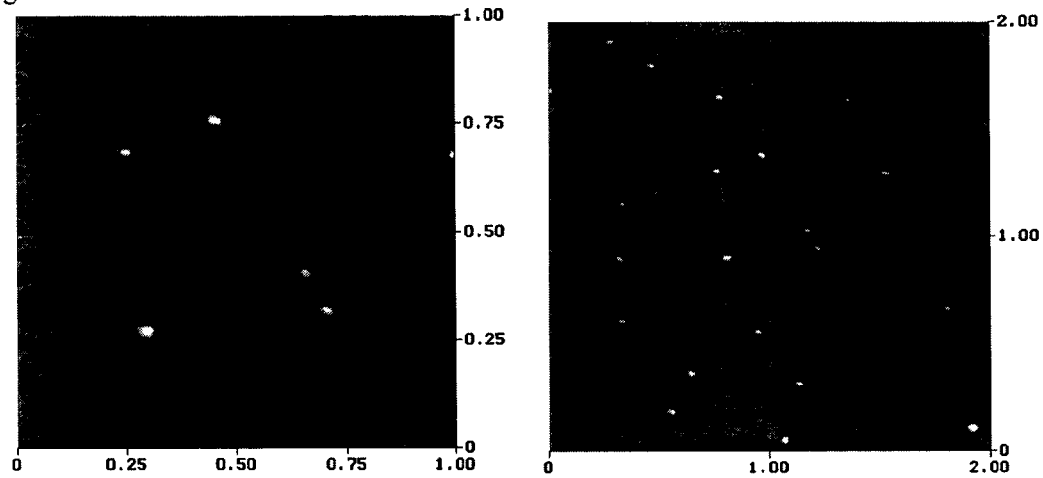
Figure 5:
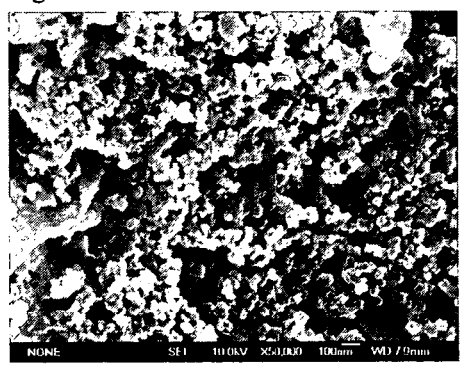
Figure 5:
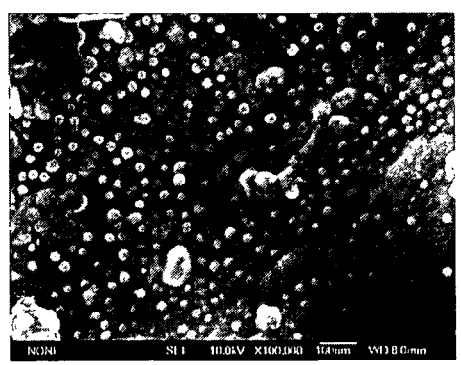
Figure 6:
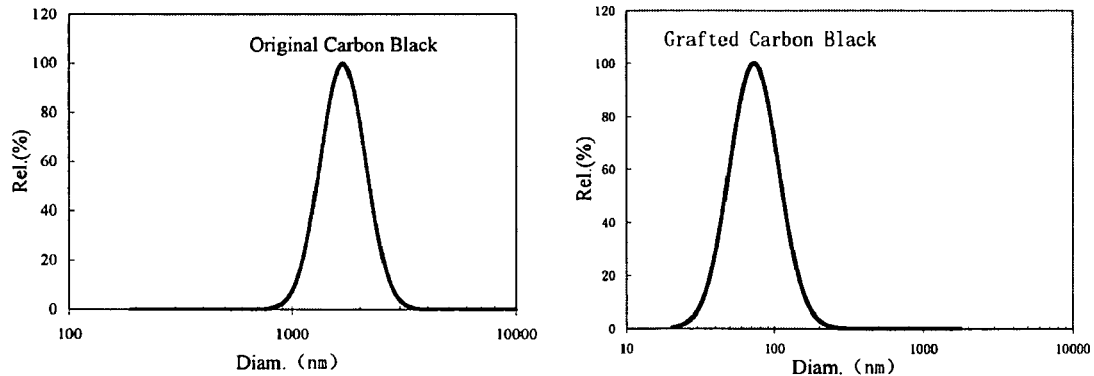
Figure 7:
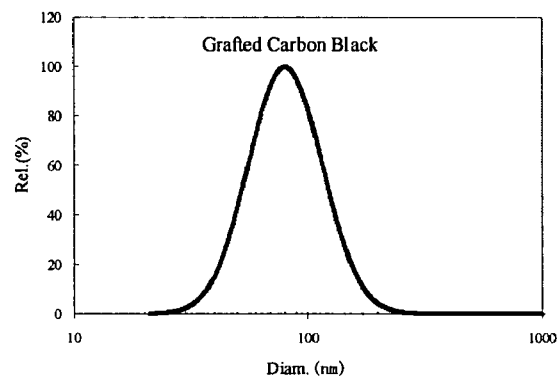
Figure 8:
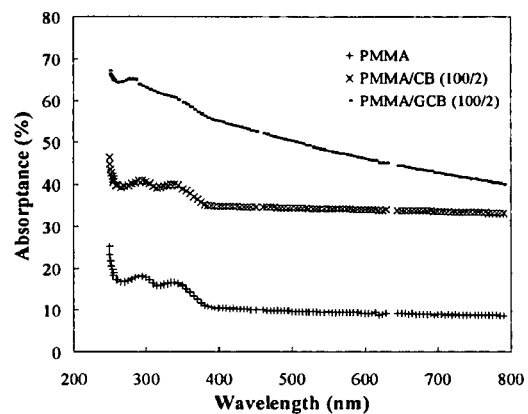

FIG. 3 shows the result of centrifuge test of grafted carbon black and ungrafted carbon black FIG. 4 is an Atomic Force micrograph of carbon black FIG. 5 is a field emission stereoscan photograph of carbon black before and after grafting FIG. 6 shows the particle size of carbon black before and after grafting FIG. 7 shows the particle size of carbon black grafted with SBR FIG. 8 shows the UV-Vis curve of PMMA film filled with carbon black grafted with AO-80

Figure 9:
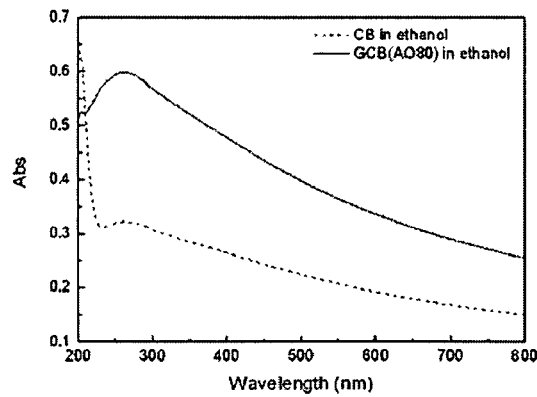
Figure 10:
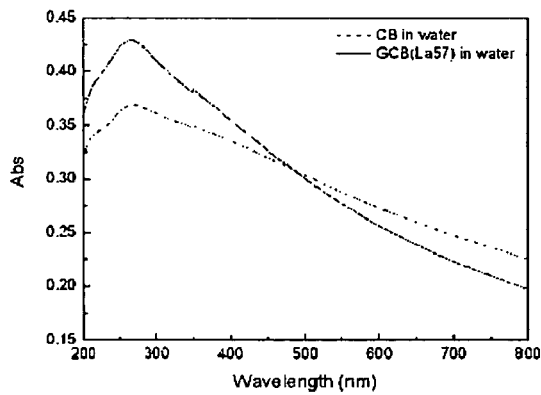
Figure 11:
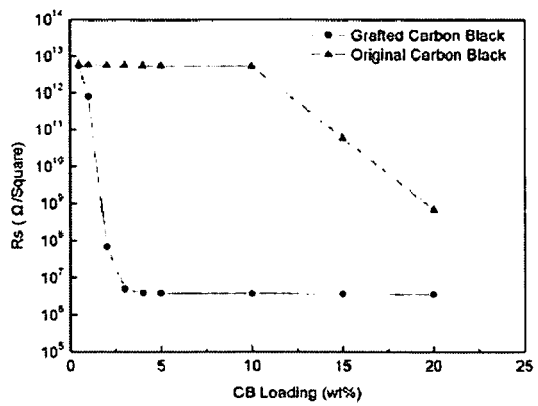
Figure 12:
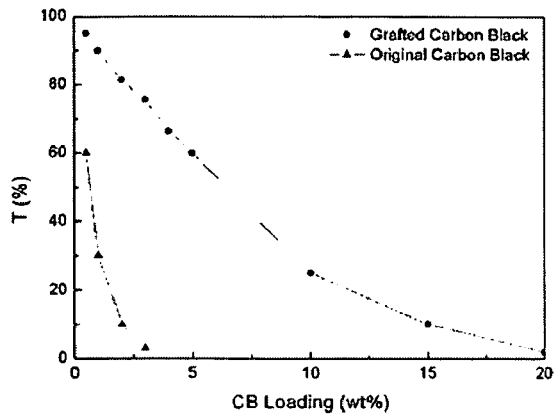
Figure 13:
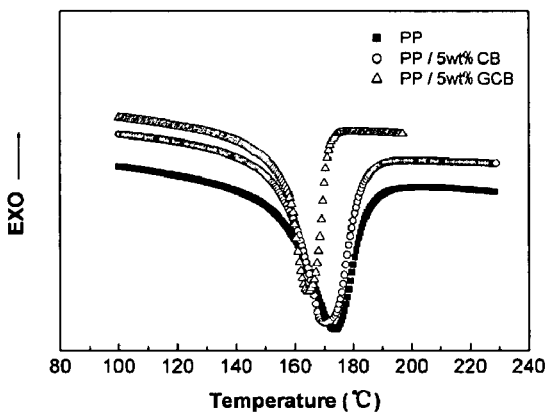
Figure 14:
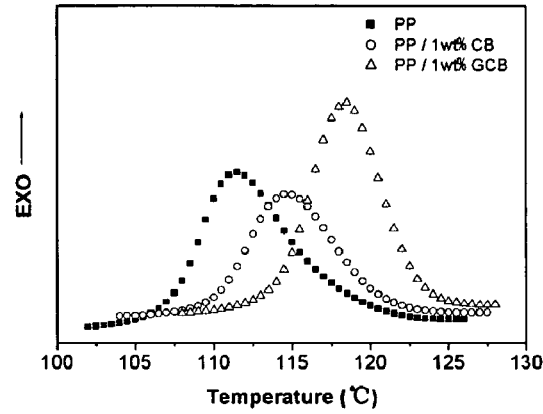
Figure 15:
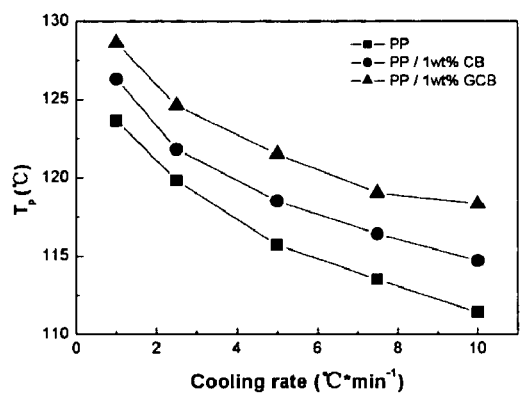
Figure 16:
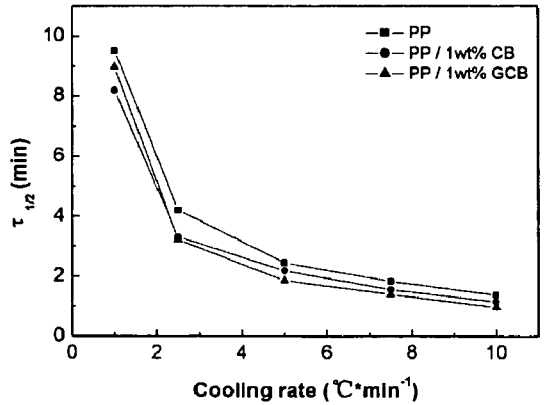
Figure 17:
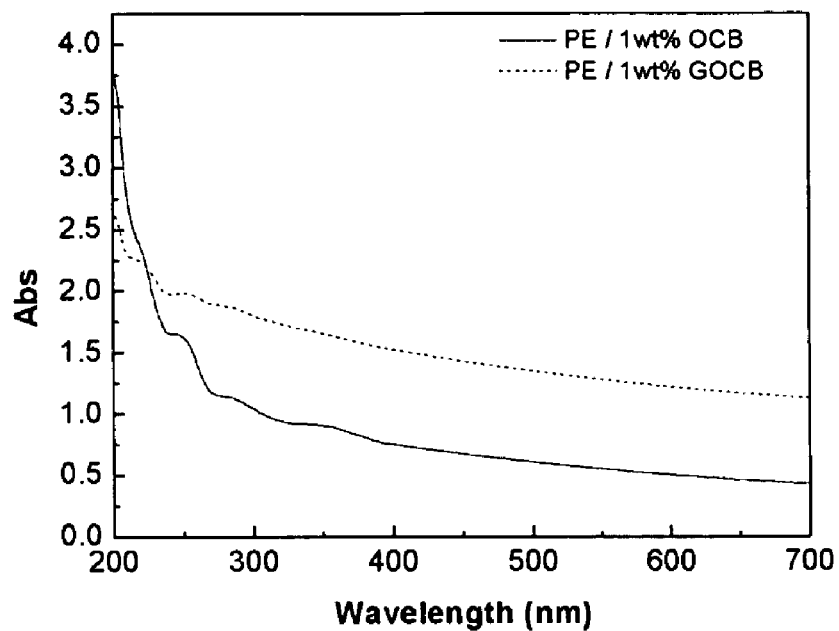
Figure 18:
Figure 18:
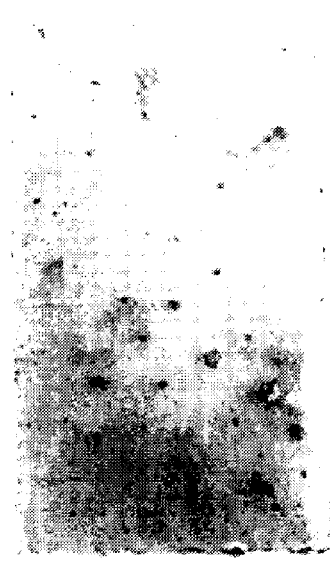
Figure 19:
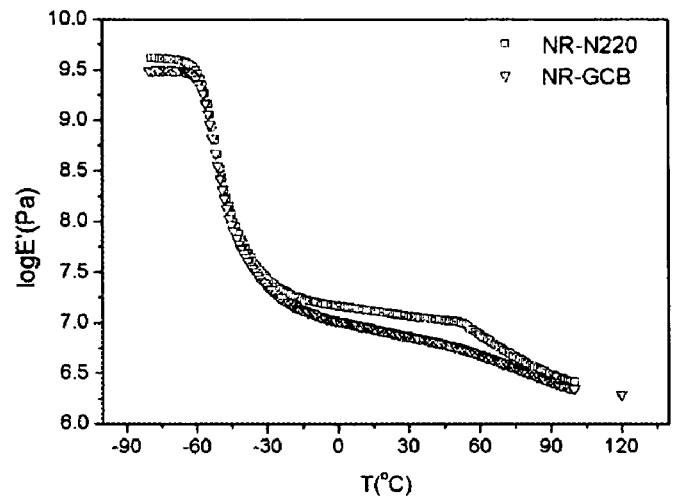
Figure 20:
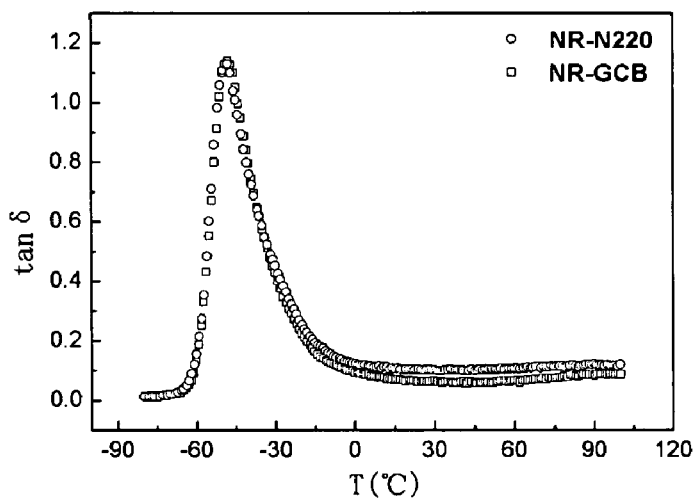
Figure 21:
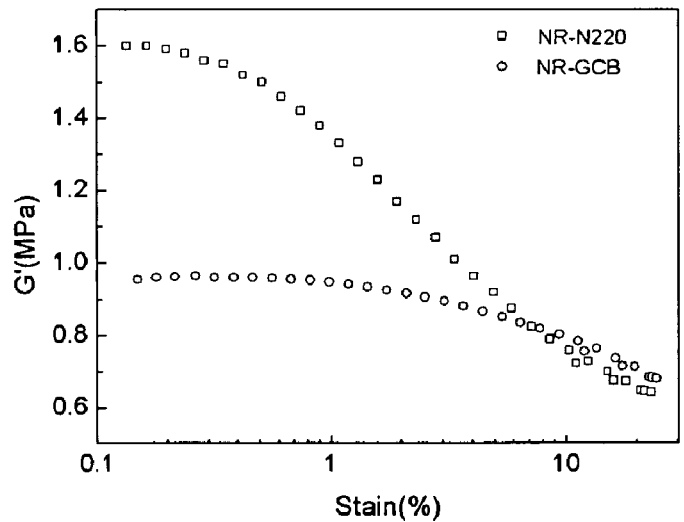

FIG. 9 shows the UV-Vis absorption curve of carbon black grafted with AO-80 in ethanol FIG. 10 shows the UV-Vis absorption curve of carbon black grafted with LA57 in water FIG. 11 shows the relation of surface resistance with filling amount of carbon black FIG. 12 shows the relation of transparency with filling amount of carbon black FIG. 13 shows the melting DSC graph of PP/5 wt % GCB composite material FIG. 14 shows the non-isothermal crystallization DSC graph of PP/1 wt % GCB composite material FIG. 15 shows the relation graph of crystallization peak value to cooling rate of PP/1 wt % GCB composite material FIG. 16 shows the relation graph of hypocrystallization time to cooling rate of PP/1 wt % GCB composite material FIG. 17 is the UV-Vis graph of PE/1 wt % GCB and PE/1 wt % CB composite material FIG. 18 is the photograph of PE/1 wt % GCB and PE/1 wt % CB composite material FIG. 19 is the Modulus-temperature dependent curve of rubber filled with grafted carbon black and rubber DMA filled with original carbon black FIG. 20 is the tan δ-temperature dependent curve of rubber filled with grafted carbon black and rubber DMA filled with original carbon black FIG. 21 is the comparative graph of Payne effect of rubber filled with grafted carbon black and original carbon black

MODE FOR CARRYING OUT THE INVENTION

Method for Synthesis of Nanophase Carbon Black

The method for synthesis of nanophase carbon black grafted in situ with organic compound of the invention includes, breaking the carbon black aggregates into primary particles under mechanical shearing force, adding organic compound(s) having or producing free radicals to carry out grafting reaction directly under the temperature over melting point of the organic compound having and producing free radicals. This reaction is pollution-free for not being performed in solution. The suitable equipments to produce mechanical shearing force include Haake rheometer, ball mill, single-screw extruder, twin-screw extruder, planetary-screw extruder, conical-screw extruder, continuous mixing roll, internal mixer, Z-kneading machine and any other commercial mixing machine which may produce mechanical shearing force. The method of this invention has the advantages of simple processes, low cost, and ability to continuous scale production.

Carbon Black

To graft organic compound as much as possible onto the surface of a carbon black, it is required that there are enough oxygen-containing functional groups such as carboxyl group, quinonyl group, phenolic group and lactonic group on the surface of carbon black, and active hydrogen atoms at the edge of surface layer. Therefore, carbon black of this invention is characterized in that oxygen content is more than 0.1%, and hydrogen content is more than 0.2%. When the oxygen content and hydrogen content are below such percents, it is possible to increase their contents by gas phase oxidation such as hot air oxidation and ozone oxidation, or by liquid phase oxidation with oxidants such as nitric acid, peroxide, potassium permanganate, hypochloric acid, bromine solution.

Various carbon black may be used as starting materials, such as conductive carbon black, reinforcing carbon black, pigment carbon black and other useful carbon black.

In this invention, the 'nanophase carbon black' has the same meaning as 'nano carbon black'; the 'original carbon black' or 'common carbon black' refer to 'ungrafted carbon black'.

Organic Compounds Having or Producing Free Radicals

The suitable organic compounds having or producing free radicals of the invention include, organic compounds which may capture free radicals on the surface of carbon black, such as the phenols and the amines and any other commercial organic compounds; the antioxidants, such as the phenols with steric hindrance, the aromatic secondary amines and the derivatives thereof, the phosphates, the thioethers; the amines with steric hindrance; the phenols; the azocompounds; the peroxides; the vulcanizers and vulcanization accelerators; fire retardants or any other commercially available small molecular organic compounds, oligomers, polymers, and any organic compounds which may produce free radicals to be captured by carbon black, by heat or mechanical shearing force, or by electromagnetic irradiation such as ultrasonic wave, microwave, ultraviolet, infrared, or by oxidation with ozone or any other oxidants. The organic compounds having or producing free radicals suitable for synthesis of nanophase carbon black grafted in situ with above organic compounds are illustrated as follows:

The Phenols:

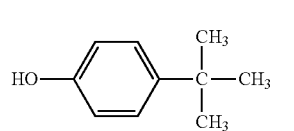
(organic compound 1)

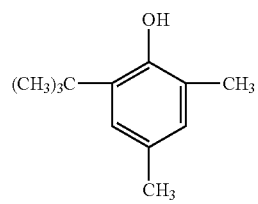
(organic compound 2)

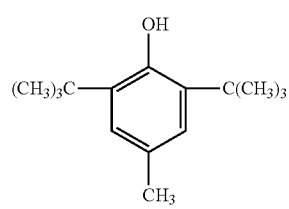
(organic compound 3)

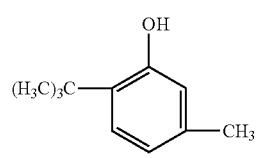
(organic compound 4)

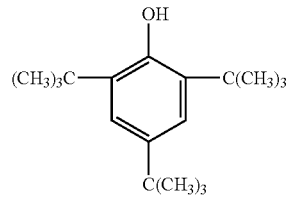
(organic compound 5)

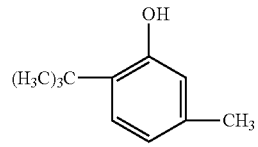
(organic compound 6)

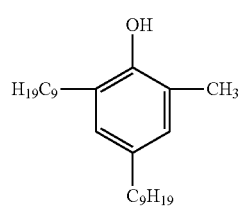
(organic compound 7)

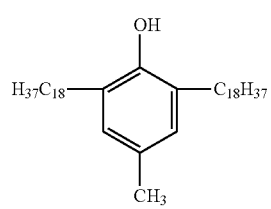
(organic compound 8)

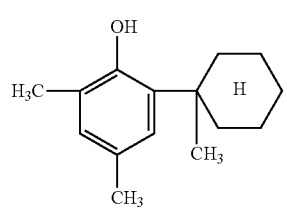
(organic compound 9)

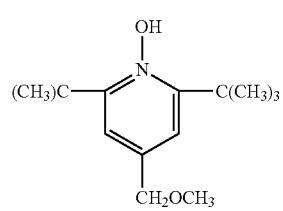
(organic compound 10)

-continued
(organic compound 11)
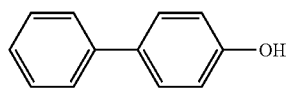
(organic compound 12)
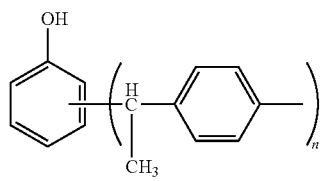
(organic compound 13)
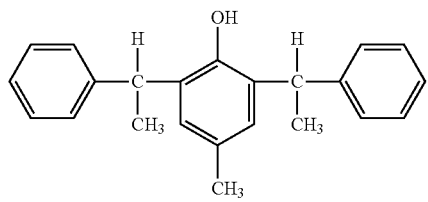
(organic compound 14)
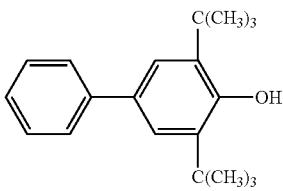
(organic compound 15)
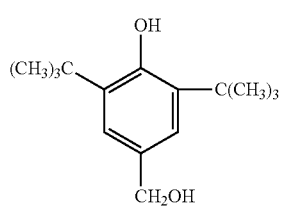
(organic compound 16)
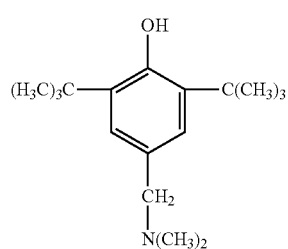
(organic compound 18)
(organic compound 17)
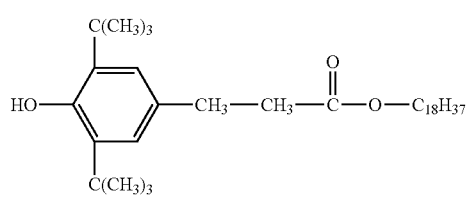
(organic compound 19)
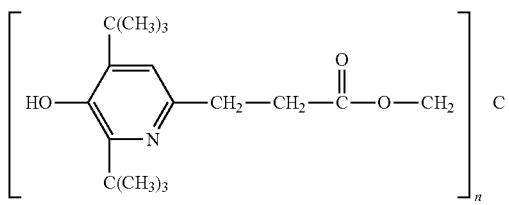
(organic compound 20)
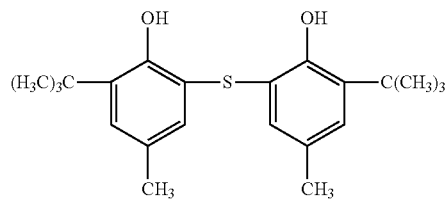
(organic compound 21)
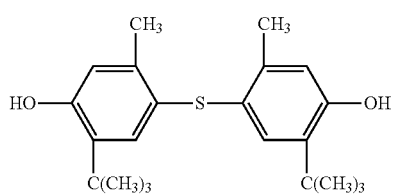
(organic compound 22)
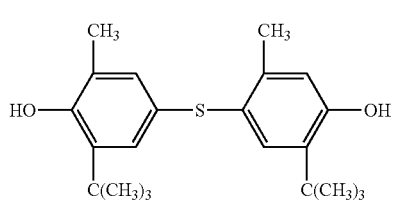
(organic compound 23)

-continued
(organic compound 24)
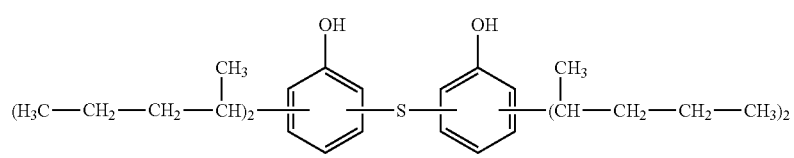
(organic compound 25)
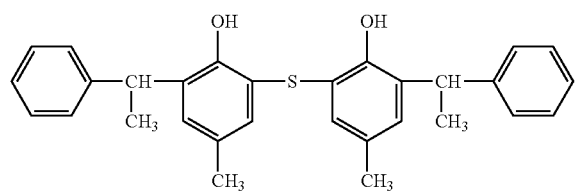
(organic compound 26)
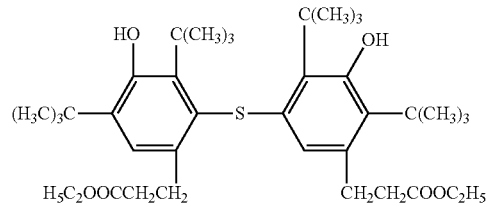
(organic compound 27)
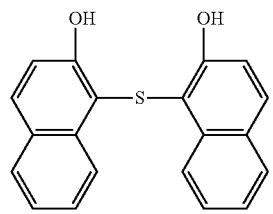
(organic compound 28)
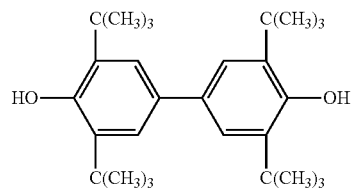
(organic compound 29)
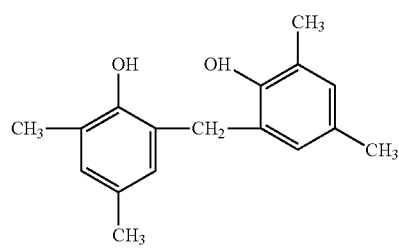
(organic compound 30)
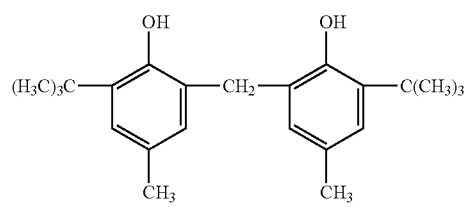
(organic compound 31)
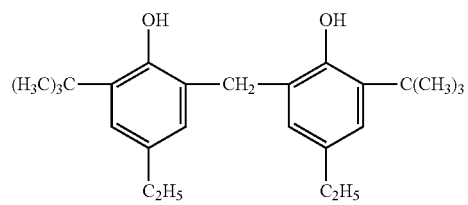
(organic compound 32)
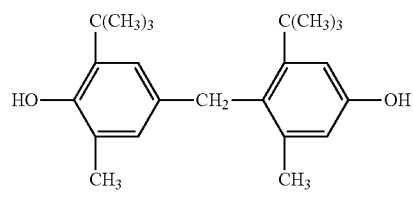
(organic compound 33)
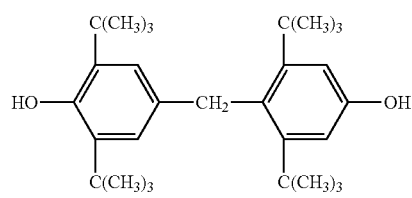
(organic compound 34)
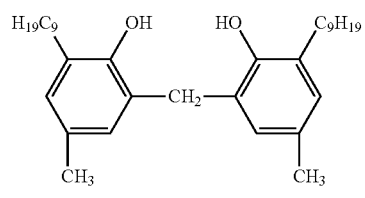
(organic compound 35)
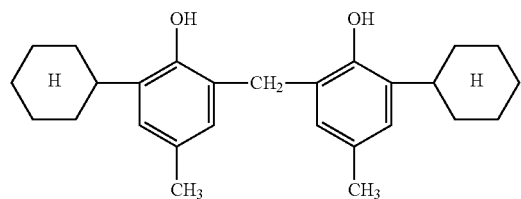
(organic compound 36)
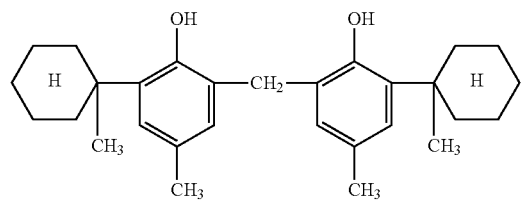

(organic compound 37) 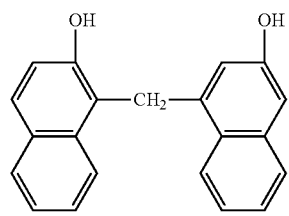
(organic compound 38) 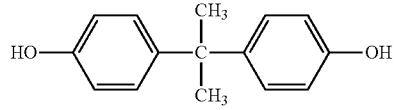
(organic compound 39) 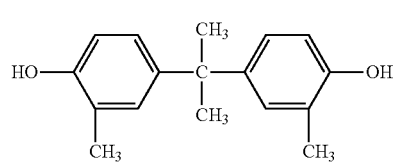
(organic compound 40) 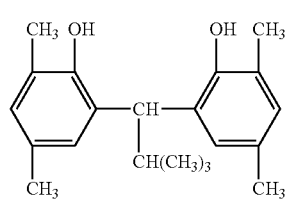
(organic compound 41) 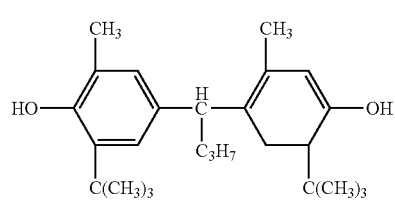
(organic compound 42) 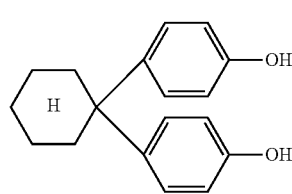
(organic compound 43) 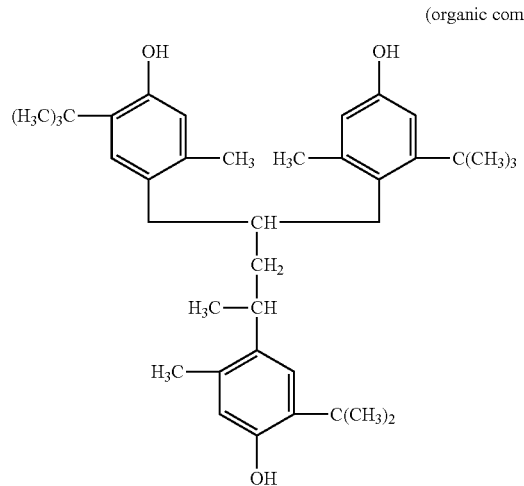
(organic compound 44) 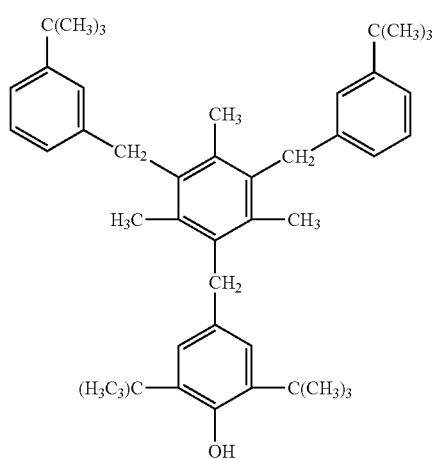
(organic compound 45) 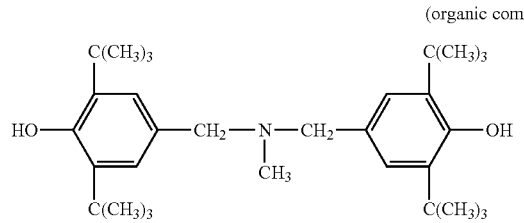
(organic compound 46) 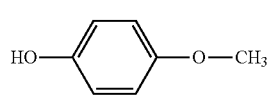

-continued
(organic compound 47)
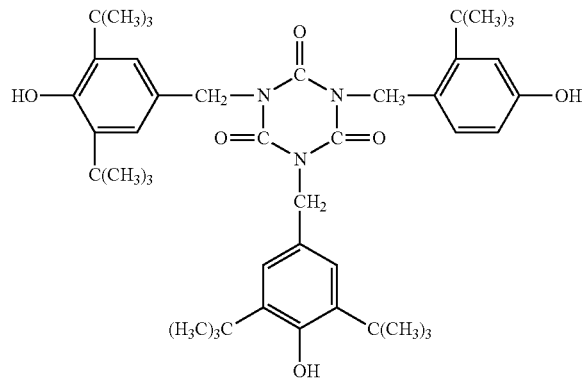
(organic compound 48)
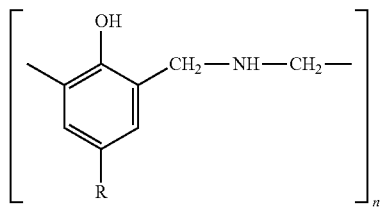
R = Alkyl
(organic compound 49)
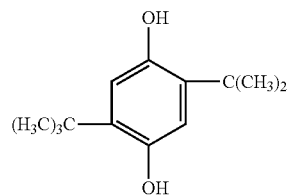
(organic compound 50)
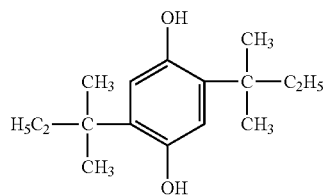
(organic compound 51)
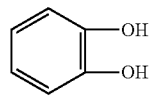
(organic compound 52)
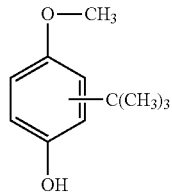
(organic compound 53)
(organic compound 54)
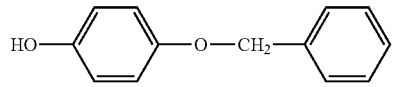
(organic compound 55)
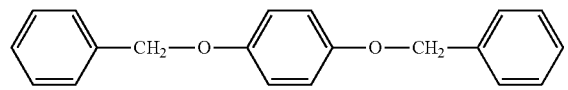
(organic compound 56)
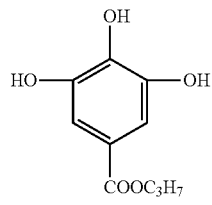
(organic compound 57)
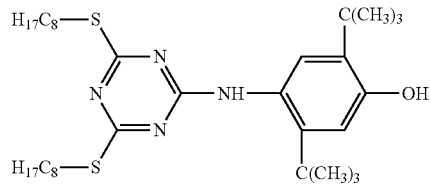
(organic compound 58)
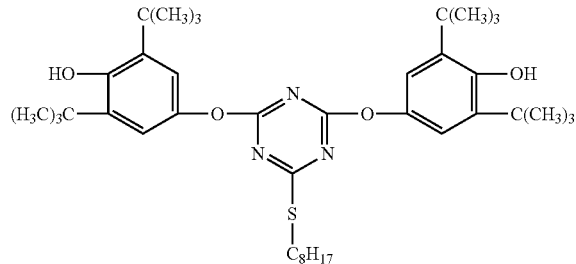
(organic compound 59)
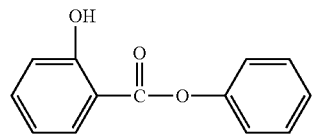
(organic compound 60)
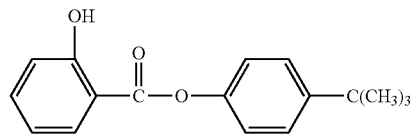

(organic compound 61)
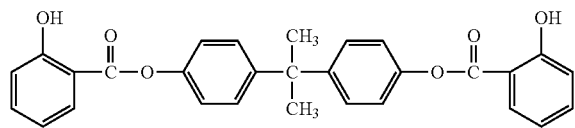
(organic compound 62)
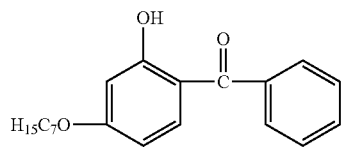
(organic compound 63)
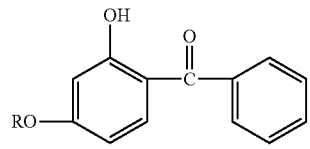
R = C₇H₁₅ ~ C₉H₁₉
(organic compound 64)
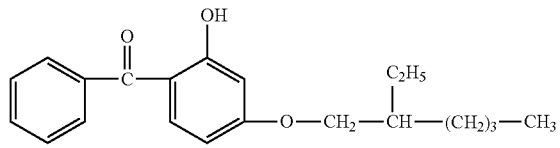
(organic compound 65)
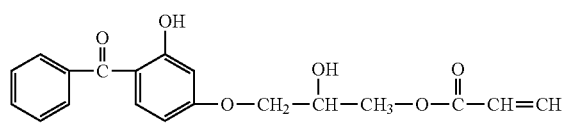
(organic compound 66)
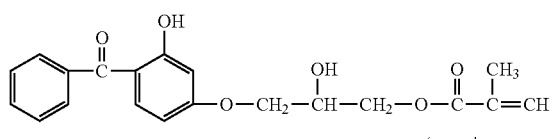
(organic compound 67)
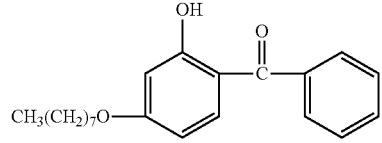
(organic compound 68)
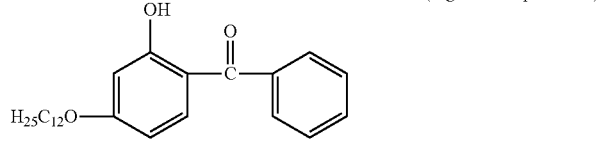
(organic compound 69)
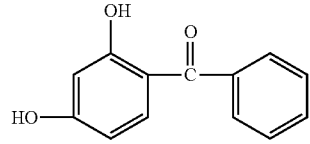
(organic compound 70)
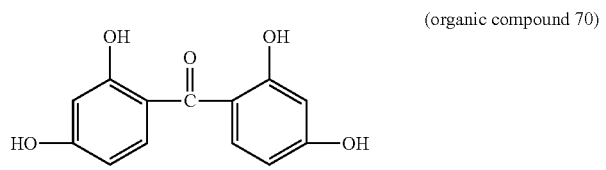
(organic compound 71)
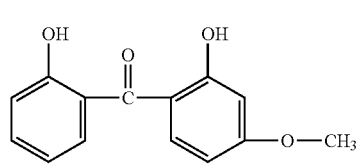
(organic compound 72)
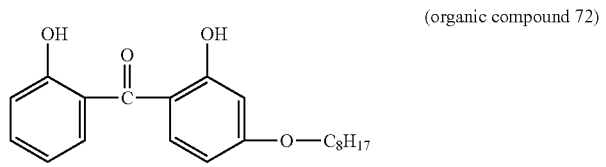
(organic compound 73)
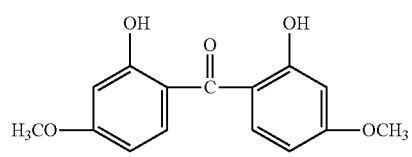
(organic compound 74)
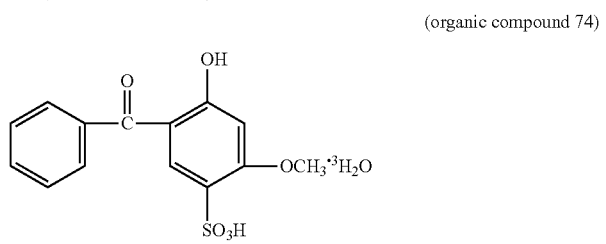
(organic compound 75)
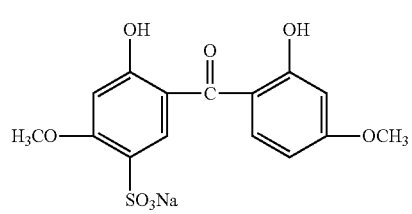
(organic compound 76)
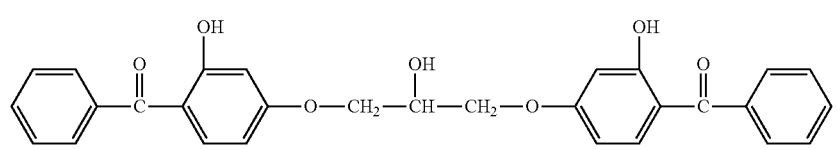

-continued
(organic compound 77)
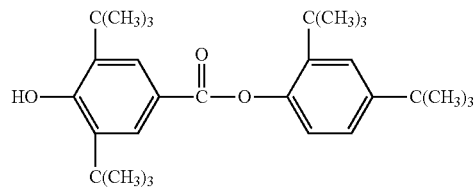
(organic compound 78)
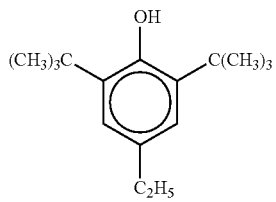
(organic compound 79)
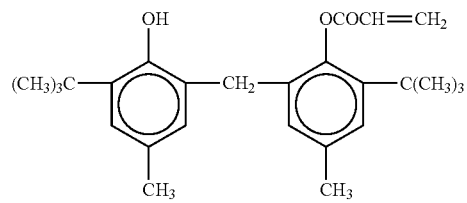
(organic compound 80)
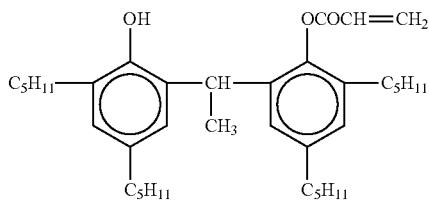
(organic compound 81)
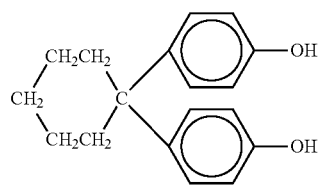
(organic compound 82)
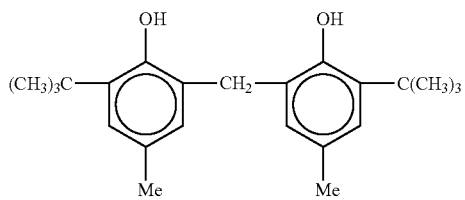
(organic compound 83)
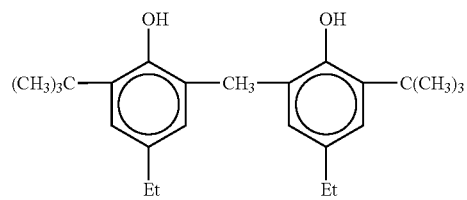
(organic compound 84)
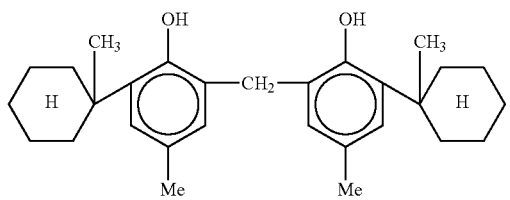
(organic compound 85)
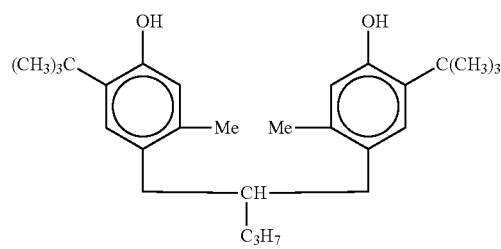
(organic compound 86)
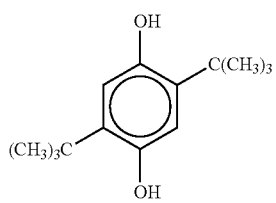
(organic compound 87)
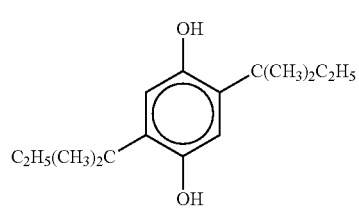

Aromatic Secondary Amines and Derivatives Thereof

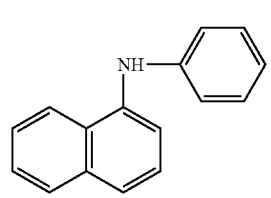
(organic compound 88)

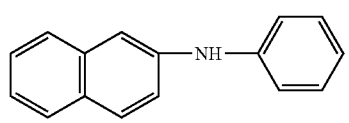
(organic compound 89)

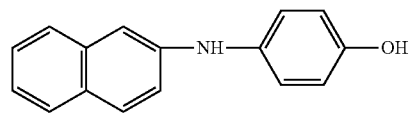
(organic compound 90)

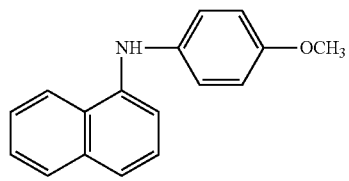
(organic compound 91)

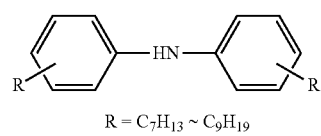
R = C$_7$H$_{13}$ ~ C$_9$H$_{19}$
(organic compound 92)

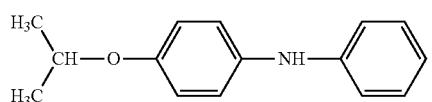
(organic compound 93)

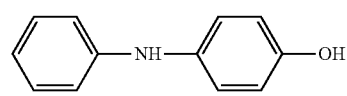
(organic compound 94)

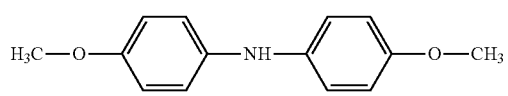
(organic compound 95)

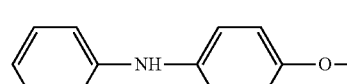
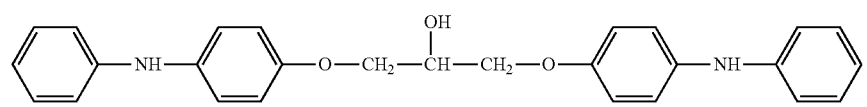
(organic compound 96)

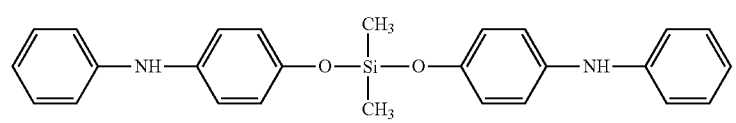
(organic compound 97)

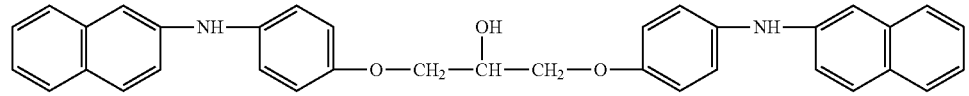
(organic compound 98)

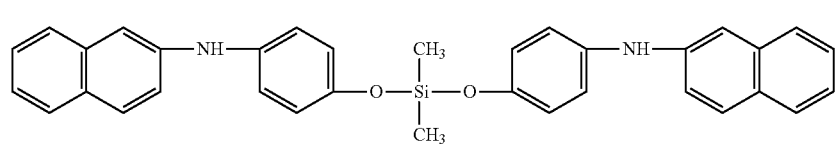
(organic compound 99)

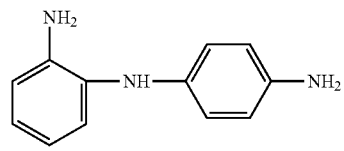
(organic compound 100)

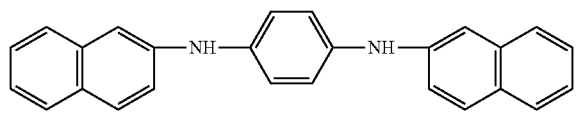
(organic compound 101)

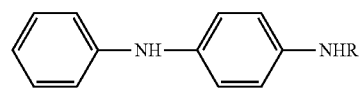
R = C$_7$H$_{15}$ ~ C$_9$H$_{19}$
(organic compound 102)

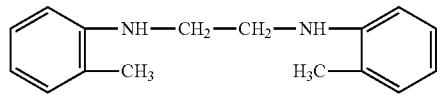
(organic compound 103)

-continued (organic compound 104), (organic compound 105), (organic compound 106), (organic compound 107), (organic compound 108), (organic compound 109), (organic compound 110), (organic compound 111), (organic compound 112), (organic compound 113), (organic compound 114), (organic compound 115), (organic compound 116), (organic compound 117), (organic compound 118), (organic compound 119), (organic compound 120), (organic compound 121)

n = 2 ~ 4

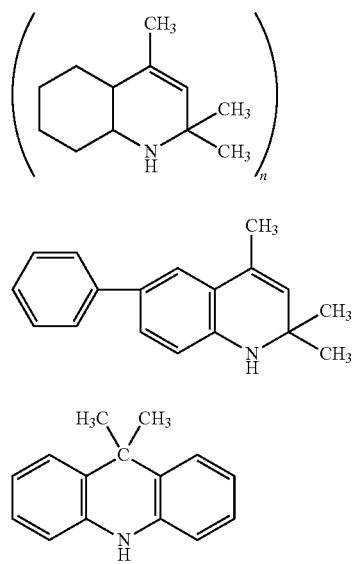 (organic compound 122)
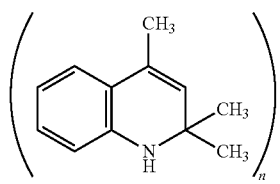 (organic compound 123)
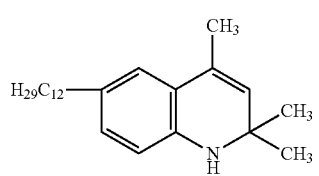 (organic compound 124)
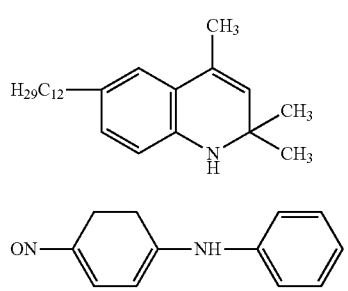 (organic compound 125)
(organic compound 126)
(organic compound 127)
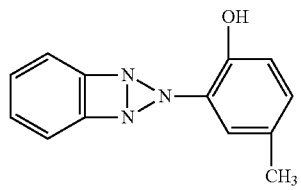 (organic compound 128)
(organic compound 129)
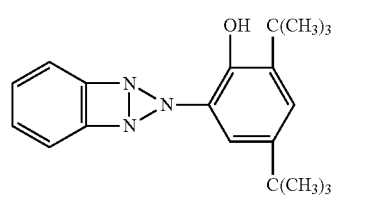 (organic compound 130)
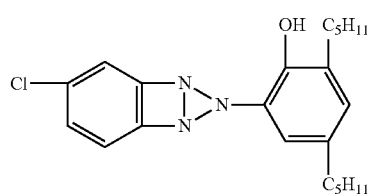 (organic compound 131)
(organic compound 132)
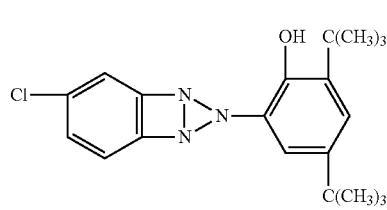 (organic compound 133)
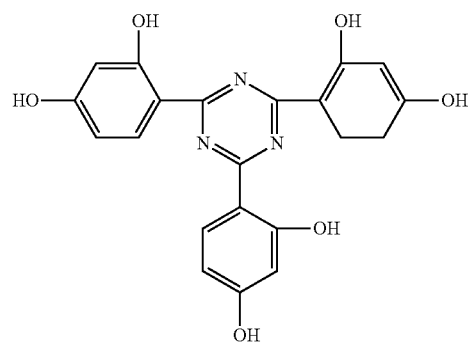 (organic compound 134)
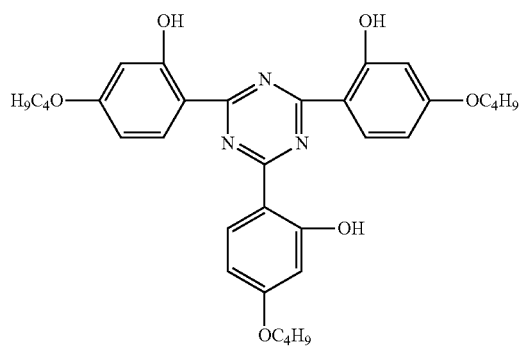 (organic compound 135)

(organic compound 136)

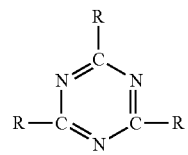

(I) R₁—NHC₅H₄NHC₆H₅
(II) R₂—OC₆H₄NHC₆H₅

(organic compound 137)

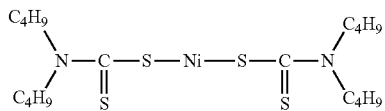

(organic compound 138)

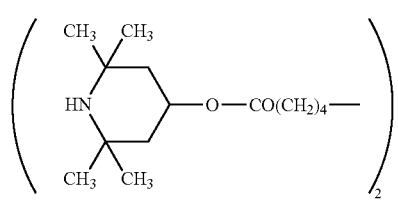

(organic compound 139)

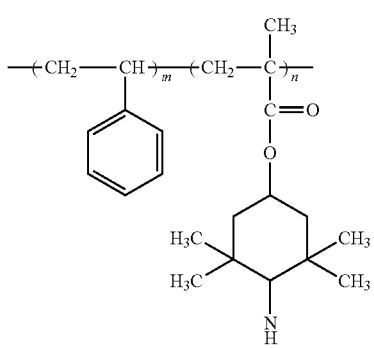

More than one organic compounds may be used in combination to adjust the compatibility with dispersive mediums such as polymers, water, and organic solvents, therefore, better multiplicative effect will be obtained than a simple component.

Third Component

The third component such as phosphate and sulfur-containing compound (preferably, thio-alcohol, thiophenol, thioether, etc.) may be added as antioxidant additive to stabilize nanophase carbon black grafted with organic compound in situ. The examples of antioxidant additive are shown below:

Sulfur-Containing Compounds Such as Thio-Alcohol, Thiophenol, Thioether, etc.

(organic compound 140)

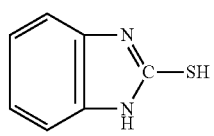

(organic compound 141)

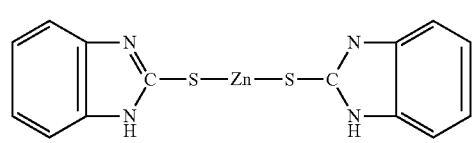

(organic compound 142)

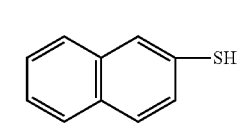

(organic compound 143)

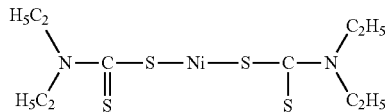

-continued (organic compound 144)

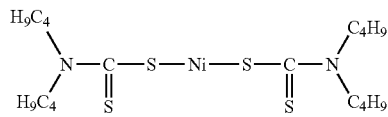

(organic compound 145)

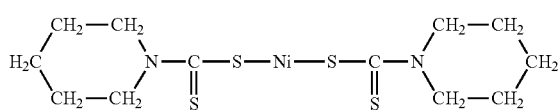

(organic compound 146)

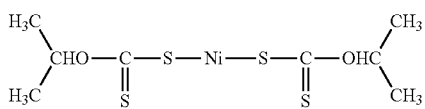

(organic compound 147)

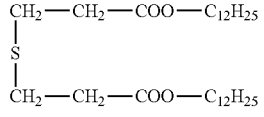

(organic compound 148)

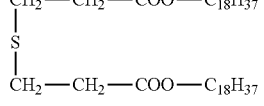

Phosphates:

(organic compound 149)

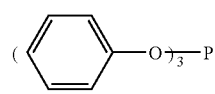

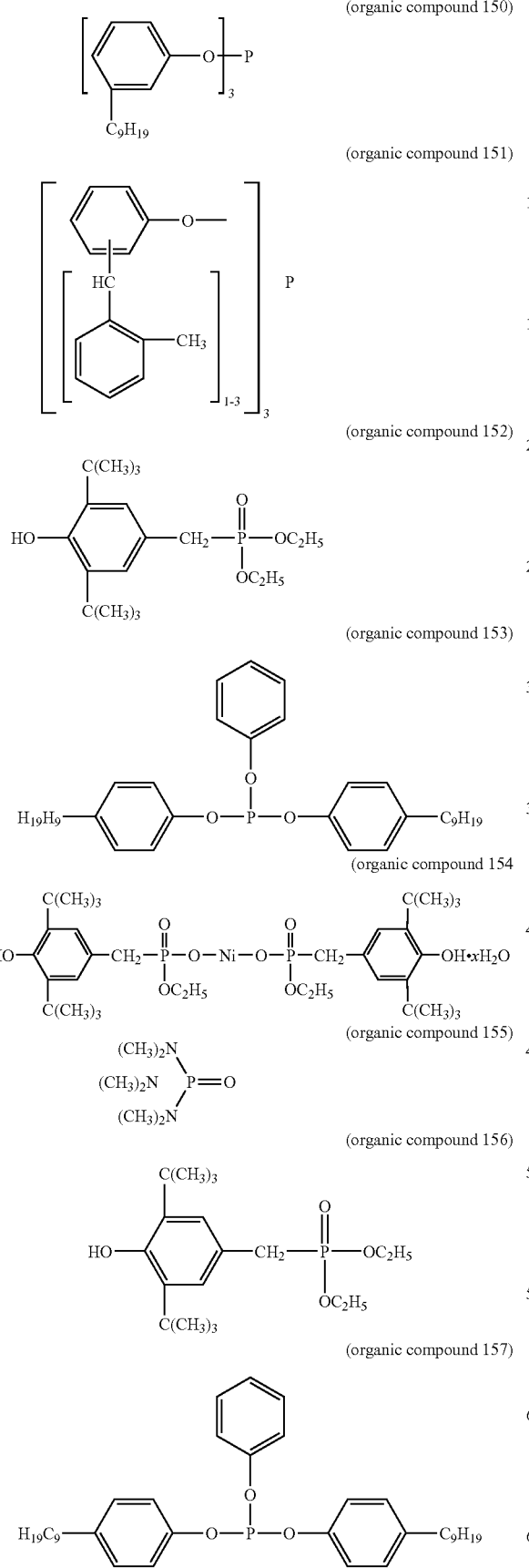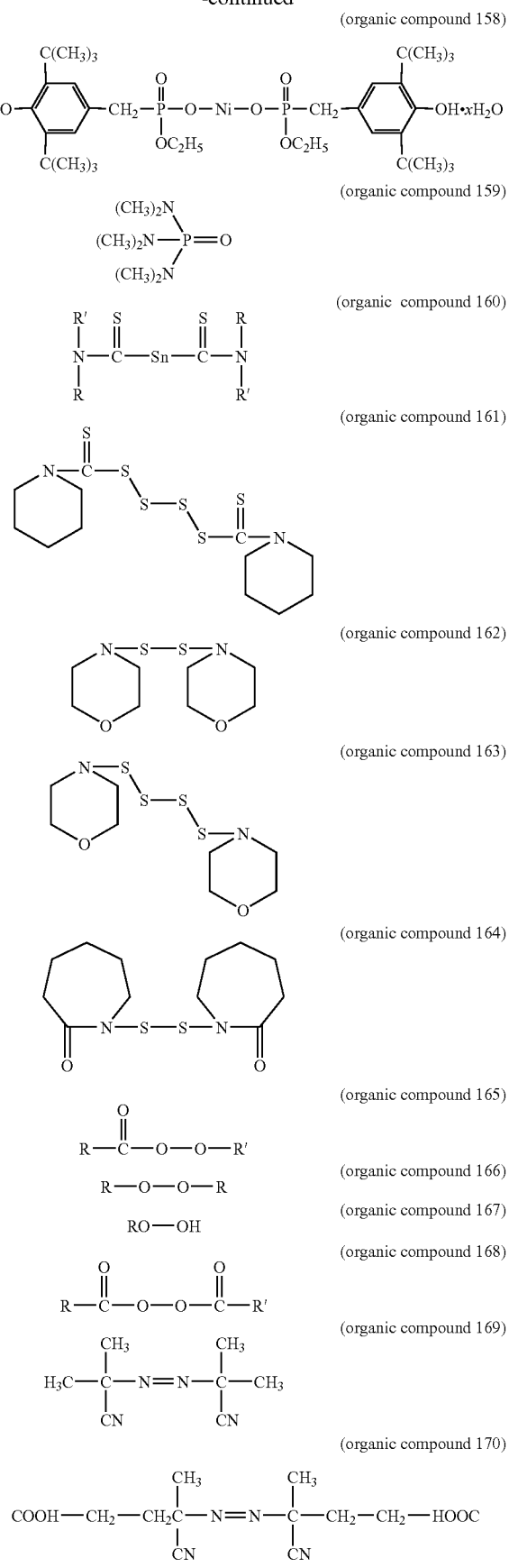

(organic compound 171)
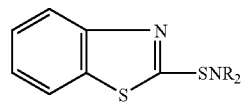

(organic compound 172)
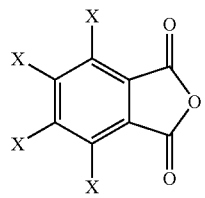

(organic compound 173)
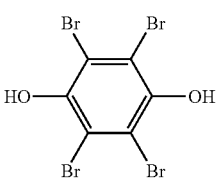

(organic compound 174)
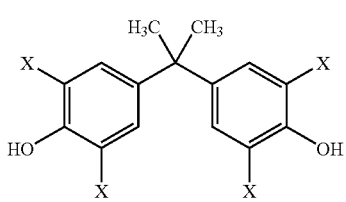

(organic compound 175)

(organic compound 176)
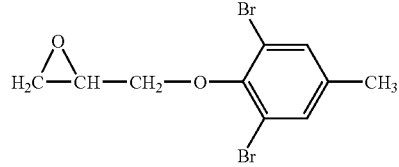

(organic compound 177)

(organic compound 178)
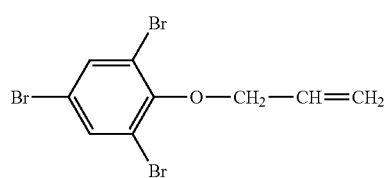

(organic compound 179)
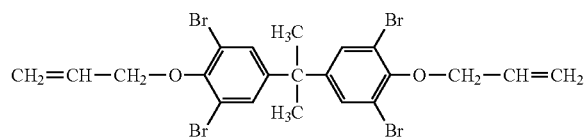

(organic compound 180)
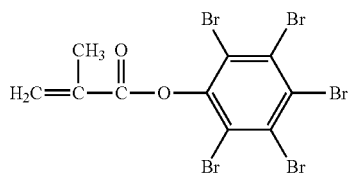

(organic compound 181)
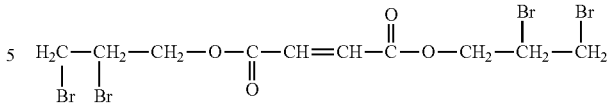

(organic compound 182)
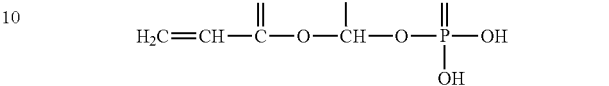

The action of mechanical shearing force may not only break the carbon black from an aggregate into primary particles, but also break the chains of organic small molecules, oligomers and polymers to produce free radicals. That is, the organic compounds that have or may produce free radicals of the present invention may originate from the breakage of organic small molecules, oligomers, and polymers under the action of the shearing force. If the amount of the free radicals formed under the action of the mechanical shearing force is insufficient, the organic small molecules, oligomers and polymers may additionally be exposed to electromagnetic irradiation, for example, ultrasonic wave, micro wave, ultraviolet, infrared wave, etc., or be treated with ozone, or be treated by oxidants, to form more free radicals. Preferably, the organic compound having lower bonding energy in molecular chain is selected herein.

The organic compounds which have or may produce free radicals of the present invention may be added alone or together with other organic compounds which have or may produce free radicals and other free radicals formed after breakage of oligomers or polymers or both.

In the nanophase carbon black grafted with organic compound in situ of this invention, the amount of grafting organic compound is 5 to 300 parts by weight, preferably 20-100 parts by weight, based on that the carbon black is 100 parts by weight. If the amount of the grafting organic compound is less than 5 parts, it's hard to prevent from reaggregation of the primary particles formed under action of mechanical shearing force, in another aspect, if the amount is more than 300 parts, the complex particles of the nanophase carbon black covered by the organic compound will lose the inherent characteristics of carbon black. The suitable ratio (grafting percent) should be chosen according to different operating requirements such as being rubber reinforcing filler, conducting agent, pigment, gas sensor, catalyst or electrochemical agent.

Preferably, the articles of nanophase carbon black comprise composite material, masterbatch, polymeric film, dispersion, transparent conductive material, transparent electrode of solar cell, paint, coating, conveying belt, ventilation pipe of mine, household appliances, tire, guide roller of printer.

Polymeric Film

The grafted nanophase carbon black may be added to polymer to form polymeric film filled with nanophase carbon black, giving the polymeric film good uvioresistance.

Conventional methods for processing polymers, such as film inflation, film coating, curtain coating, spray coating, injection moulding, compression moulding, extrusion, etc. may be used to prepare final products from intermediates.

Transparent Electroconductive Material

The grafted nanophase carbon black may be used as electroconductive additive for preparing polymer-based transparent electroconductive material. The transparent electroconductive material refers to such kind of material that have both electroconductivity and high light transmittance, which may be applied in antistatic material, electromagnetic shielding, display screen, or contact screen. The transparent electroconductive materials known in the art include oxide of Indium and Tin (ITO) which is fragile and inflexible, polyelectrolyte material whose electroconductivity depend on humidity of the environment, electroconductive polymers having poor environment stability and heat stability, and carbon nanotube of which the surface modification and dispersion processes are complicated.

Carbon black is widely used as electroconductive filler for polymer. General carbon black exists in polymer as aggregate, consequently, the amount of filler is large to meet the requirement for electroconductivity so that the material formed therefrom is black and opaque since the visible light is absorbed and reflected mostly as falling across the carbon black aggregate. On the contrary, the scattering of light in the polymeric composite material filled with nanophase particles conforms to the following formula:

$$\frac{I}{I_0} = e^{-\left[\frac{3\Phi_p x r^3}{4\lambda^4}\left(\frac{n_p}{n_m}-1\right)\right]}$$

r particle radius
np refractive index of particle
nm refractive index of matrix
I intensity of the transmitted
I0 intensity of the incident light
φp the volume fraction of the particles
λ the wavelength of light
X the optical path length According to the above formula, it is necessary that several requirements should be satisfied to obtain transparent polymeric material filled with carbon black: (1) the size of the particles is small enough; (2) the amount of filled particles is low enough; (3) the refractive indexes of the particles and the polymer matrix are as close as possible.

The particles of grafted nanophase carbon black of this invention have a small size of below 100 nm, and the particles at a very low filler amount may form an electroconductive path by self-assembly, still, the refractive index of the particles may be controlled as close as possible to that of the matrix by grafting different small molecules. Therefore, the visible light reflected by the grafted nanophase carbon black decreases greatly, and the grafted small molecule layer may shield some light absorption of carbon black by refraction of light. In another aspect, the thickness of the grafting layer with small molecules on the surface of carbon black is much thinner than that of the grafting layer of carbon black grafted with polymers, therefore the conductivity of carbon black will not be affected greatly. A novel material, which meets both the requirements of electroconductivity and transparency, may be produced by such steps as: choosing suitable small molecules to prepare grafted nanophase carbon black with different surface characteristics, adding the carbon black to transparent polymers as conductive additive. The novel material also have advantage over the abovementioned transparent materials, such as softness and resistance to bending, environment independence, good thermal stability, low cost, simple processes as for continuous scale production.

Any other transparent or semi-transparent polymeric material may be used as matrix, such as polyester, polycarbonate, polystyrene, polyethylene, polypropylene, polyurethane, polyvinyl alcohol, polyimide, acrylic resin, etc.

Any method of polymer treatment may be used to add nanophase carbon black grafted with organic compounds into polymeric matrix, such as melting mixing, solution mixing, in situ polymerization.

Plastic Articles

Carbon black is an important coloring agent, conducting agent, and filler in plastic articles, which plays an important role in the production of plastic articles. The characteristics of carbon black affect the processing properties and application properties of the plastic articles greatly. Its blackness in dispersion depends on the particle size of carbon black to an intensive extent. As a result of small particle size, the specific surface area become larger for absorbing ultraviolet and visible light, and forward-angle scatter of ultraviolet and visible light become more effective, therefore the blackness of main color become darker and anti-UV effect is better. When the particle size of carbon black decreases, the absorbance increases and the tinctorial power become stronger, at the same time, the specific surface area become larger, which means that it requires higher moisture energy and dispersion energy to disperse in plastics, while the dispersion state affects the polish of plastics extremely. Usually, it's hard for pigment carbon black of small particle size to disperse in plastics matrix. Such problem is perfectly solved by the invention of nanophase carbon black grafted in situ with organic compounds, where the organic small molecules covering the surface of carbon black provide a good solution for carbon black to disperse in plastics matrix under the condition of decreasing particle size of carbon black and increasing specific surface area, so that the nanophase carbon black grafted with organic compounds may be used for pigmentation in various plastics, which has the virtues of low addition amount, strong pigmentation, high glossiness.

Reinforcing Rubbers

Many materials requires both high strength and high elasticity during application, however traditional elasticized materials are mostly organic elastomers, such as CPE, EVA, MBS, SBS, ACR, NBR and the like. Though traditional elasticized materials have good performance in impact resistance after reinforcement, but at the same time the elastomers often sacrifice strength, rigidity, dimensional stability, heat resistance, and processability to obtain high elasticity. Rigid particles may be satisfactory way to both sides to overcome all these problems. Typically, inorganic rigid particles for reinforcement need to have small particle size and to be modified in surface for preventing aggregation. Nanophase carbon black grafted in situ with organic compound is a good example as a reinforced particle, for it has the same rigidity as carbon black being able to significantly promote strength when added into a matrix, and also has good dispersion in the matrix. In regard to crystalline polymers, nanophase carbon black grafted in situ with organic compound may increase the melting point, crystallinity, crystalline growth velocity of such polymers, and make the crystalline particles of such polymers more fine and more homogenous, thus improving the product quality promptly, shortening its production period, and bring manufacturers great profits.

Carbon black material is the most important reinforcing filler in rubber industry. To obtain the best reinforcement effect, carbon black material need to disperse in rubber matrix sufficiently, for the carbon black material aggregates, not dispersive, may impair the physical and mechanical performance of vulcanized rubber. Meanwhile, only when there is firm bonding between the carbon black material and the molecular chains of rubber will the vulcanized rubber gain good performance. The most effective way to increase strength of rubber is to graft molecular chains which have affinity with the dispersive mediums on the surface of carbon black. Since the organic grafting layer covering the surface of the grafted carbon black of this invention has excellent compatibility with rubber matrix, the grafted carbon black may not only improve dispersion of carbon black material among polymeric matrix, but also strengthen the interaction of carbon black and rubber.

Routine process of polymer handling may be employed to introduce the nanophase carbon black grafted with organic compound in situ to the polymeric matrix, such as melting mixing, solution mixing, in situ polymerization.

Dispersion

Nanophase carbon black of the invention may be added into water or organic solvents, such as water, acetone, ethanol, ethyl acetate, toluene and other organic solvent, to form a dispersion, which has better ultraviolet absorption in the ultraviolet wave range of 200-400 nm than the dispersion of unmodified carbon black.

Coating

The nanophase carbon black is suitable for synthesis of conductive water borne coatings or antistatic water borne coatings. Along with the development of recognition of environment protection and tendency of stricter regulations of environment protection, water borne coatings attract more and more attention. Hydrophilic or water-soluble organic compounds may be grafted onto the surface of carbon black, solving the problems of compatibility of carbon black and water base resin varnish and dispersion of carbon black in water borne coatings, meanwhile, the grafting nanophase carbon black of this invention may be used for synthesis of conductive water borne coatings or antistatic water borne coatings.

The conductive water borne coatings prepared from nanophase carbon black grafted in situ with organic compound are characterized in that wherein the nanophase carbon black grafted with organic compounds is added into water resin varnish, to give them antistatic performance or conductivity.

Preferably, various carbon black, including pigment carbon black, rubber carbon black, conductive carbon black or any other useful carbon black may be used as starting material.

Preferably, the suitable organic compound in nanophase carbon black grafted in situ with organic compounds is water-soluble or hydrophilic organic compound.

The conductive water borne coatings of the invention may employ water resin varnish such as water acrylate, water epoxy resin and any other commercial resin varnish suitable for water coating.

Exemplary formulations of the above conductive water coating include, but not limited to, 80-100 parts by weight of water resin varnish, 15-30 parts by weight of the grafted carbon black.

Conductive water coatings are applicable in top-coat of automobiles and exterior wall painting.

Black Particles

The grafting nanophase carbon black of the invention may be used as black particles for "electronic paper" display directly. The electronic paper is a thin type device for displaying books, brochures, advertisements, etc., of which the fundamental principle is, the charged white or black particles move to surface of the display screen under electric field, to display in two colors of black and white. The key technique influencing the display quality depends on particle size, charge-bearing ability, whether easy to aggregate and electrophoretic property.

Grafting nanophase carbon black of the invention may be used to achieve high performance of black display powder, by manipulating the types and quantities of grafted small molecules to control the particle size of carbon black, avoiding aggregation of carbon black, and bearing positive charges or negative charges as required by surface treatment of carbon black.

Grafting carbon black itself, or mixed with various organic mediums, may prepare black powder bearing positive or negative charges applicable to display material of an electronic display ("electronic paper", in common name); where (1) the organic mediums may be organic small molecules or organic polymeric materials; (2) the mixing may be fulfilled by mechanical mixing or in situ polymerization (emulsion polymerization) (3) the size of black powder may range from 0.01 to 100 μm.

Composite Materials

Composite materials may be prepared according to the following steps: plastics and the nanophase carbon black are heated and mixed in a processing equipment, where the quantity of the nanophase carbon black is 0.001-5% of that of the composite material, under a processing temperature of 140-170° C., for a mixing time of 10-30 min, to obtain the product.

Preferably, the action of high mechanical force refers to the action of Haake rheometer or ball mill.

The processing equipment of carbon black/plastics composite material preferably refers to mixing equipment such as twin-roll, extruder.

Methods for the Preparation of Reinforcing Rubber

Any method for processing rubber may be used to add nanophase carbon black grafted in situ with organic compounds into a matrix, such as mixing in a roll mixer, in an internal mixer, in a rotary continuous mixer, in a transfer-type continuous mixer, in Haake rheometer and the like, include:

(1) 100 parts by weight of rubber and 10-80 parts by weight of the grafting carbon black are mixed together with other additives such as anti-aging agent, vulcanization accelerator and vulcanizing agent under a temperature of 20° C.-50° C., for 10-15 min to obtain mixed rubber.

(2) the mixed rubber of step (1) is placed for 24 hours, and vulcanized for 10-60 minutes under a temperature of 100-200° C. to obtain reinforcing rubber.

Any method for processing rubber may be used to prepare the final products from intermediates, such as injection, die pressing, etc.

Nanophase carbon black may be added into rubber matrix as reinforcing agent, giving rubber excellent performance such as mechanical performance, wear-resisting performance, moisture-resisting performance under low temperature, and low rolling resistance under high temperature.

Black Masterbatch

Black masterbatch prepared by grind mixing of nanophase carbon black, a carrier and a coupling agent, may be used in pigmentation of various plastics, which has the virtues of low addition, good dispersion in plastic matrix, strong pigmentation and high glossiness. The mixing equipment, such as haake rheometer, extruder, internal mixer may be employed.

The nanophase carbon black is 20-70 wt % of the black masterbatch.

The black masterbatch is suitable for pigmentation of plastics, such as low or high density polyethylene, isotactic or syndiotactic propylene, general-purpose and shock-resisting type polystyrene, soft or hard polyvinyl chloride, acrylonitrile, copolymer of butadiene and styrene, polycarbonate, nylon, cellulose, fluorocarbon, silicone, polyoxymethylene, polyformaldehyde, polyester resin, alkyd resin, phenolic resin, epoxy resin, acrylate resin, amino resin, diallyl phthalate.

Now the present invention is further illustrated by the following examples.

Example 1

The nanophase carbon black using antioxidant AO-80 consisted of 100 parts by weight of carbon black ungrafted (N220, available from Mitsushita Chemical Corporation) and 80 parts by weight of AO-80 (available from ASAHI DENKA CO., LTD.).

AO-80 is a trade name of a kind of phenol antioxidant with steric hindrance that may produce active free radicals, with its melting point being 125° C., of which the standard name is 3,9-bis{1,12-dimethyl-2-[β-3-tert-butyl-4-hydroxy-5-cresol]propionyloxy-}ethane)}-2,4,8,10-tetraoxaspiro[5,5] undecane. The formula is illustrated as follows:

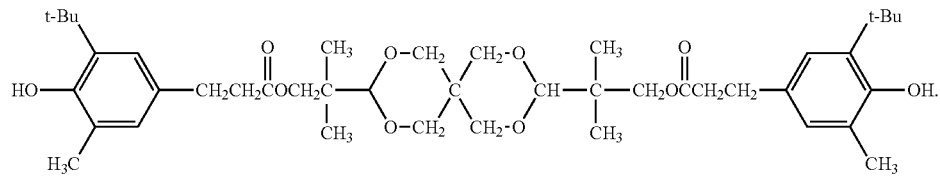

The carbon black and AO-80 were melt blended at 140° C. which is higher than the melting point of AO-80 (125° C.) for 30 minutes, in Haake rheometer of which the rotational speed is 60 rpm. The torque of the blends of the AO-80 and carbon black increased sharply after being blended for about 3.5 minutes and the temperature reached 175° C., and the torque became stable when the reaction was complete.

The reactant of carbon black and AO-80 formed above was put into a Soxhlet's extractor and extracted with toluene for 72 hours to ensure complete removal of any free AO-80 from the carbon black. Take a sample from the filtrate after extraction and the grafted carbon black for measurement with FTIP-ATR. It was found that the filtrate is free from AO-80, indicating that the exaction was complete. And the FTIR-ATR spectrum of the carbon black modified with the AO-80 shows that the surface of the carbon black was grafted with AO-80.

At the same time, a thermogravimetric test for the above nanophase carbon black after extraction was carried out under nitrogen with SDT Q600 V5.0 Build 63 thermogravimeter (from TA Company, U.S.), where the temperature ranges from 20 to 900° C., the warming-up rate was 10° C./min, and the gas purging rate was 80 ml/min. The final test results showed that 8.5% of the AO-80 was grafted onto the surface of carbon black.

1 part of ungrafted carbon black and 1 part of grafted carbon black were put into the beakers respectively, and then 100 parts of acetone was added. The beakers were placed in an ultrasonic cleaner (DL-360D) (from Zhixin Instruments Company, Shanghai) to disperse in ultrasonic for 10 min under a controlled temperature of 25° C., forming a carbon black dispersion. After that, a centrifugal sedimentation experiment was performed in LDZ4-0.8 centrifuge (from Medical Centrifuge Plant, Beijing), to testify the extent of dispersion. 5 ml of liquid dispersion was taken and put it into the centrifuge (4000 rpm), and then the dispersion index thereof was tested every 10 minutes. As illustrated in FIG. 3, the carbon black would deposit when ungrafted; on the contrary, the suspension of the grafted carbon black keeps stable for a long time, achieving the purpose of this invention.

The distribution of the particle size in the suspension was tested with BECKMAN COUTLER laser light-scattering granulometer. The size distribution was shown in Table 1. However, it was noticed apparently that there were large deposit of carbon black aggregates in the suspension of the ungrafted carbon black (N220) dispersed by ultrasonic. The size distribution in the suspension was shown as Table 2. After comparison of the data in Table 1 and Table 2, it was found that the effect is prominent when the carbon black is grafted with AO-80 on its surface.

TABLE 1

The size distribution of the grafted carbon black(N220/AO-80) of Example 1 in acetone

| | Size (nm) | | | |
|---|---|---|---|---|
| | 48 | 52 | 57 | 413 |
| Number (%) | 49 | 35 | 15 | 1 |

TABLE 2

The size distribution of the ungrafted carbon black

| | Size (nm) | | | | | | | |
|---|---|---|---|---|---|---|---|---|
| | 94 | 122 | 139 | 158 | 180 | 205 | 234 | 1749 |
| Number (%) | 21 | 7 | 10 | 23 | 19 | 3 | 4 | 3 |

Samples of the stable suspension were taken and observed with Atomic force microscope and field emission scanning electron microscope, obtaining photographs of a nearly monodispersive carbon black, where the size is around 30 nm (see FIG. 4, FIG. 5). Such results were in complete consistency with the results tested by abovementioned laser light-scattering granulometer.

The other general properties of grafted carbon black were characterized, and the data were shown in Table 3:

TABLE 3

The general properties of grafted carbon black (N220/AO-80) of Example 1

| | items | | |
|---|---|---|---|
| carbon black | iodine uptake (g/kg) | DBP absorption (ml/100 g) | CTAB absorption surface area (m²/g) |
| Ungrafted | 108 | 115 | 108 |
| grafted | 50 | 74 | 84 |

The result that iodine absorption value and the CTAB absorption value of the grafted carbon black are lower than those ungrafted ones represents that, specific surface area of the grafted carbon black is comparatively small which means that the surface of the carbon black is covered with organic compounds so as to reduce its specific surface area. The reduction in DBP absorption represents that the grafted carbon black has low structure, that is, the grafted carbon black has no large aggregates and distributes evenly.

Example 2

The nanophase carbon black using antioxidant AO-60 consisted of 100 parts by weight of carbon black ungrafted (N220, available from Mitsushita Chemical Corporation) and 80 parts by weight of AO-60 (available from ASAHI DENKA CO., LTD.).

AO-60 is also a trade name of a kind of phenol antioxidant with steric hindrance that may produce active free radicals, with its melting point being 115° C., of which the standard name is 4[β-(3,5-di-tert-butyl-4-phenol) propionyloxy]methane. The formula is illustrated as follows:

The reaction conditions were the same as those of Example 1 except that the set temperature of the Haake rheometer was 130° C. The size distribution measured by laser light scattering granulometer was illustrated in Table 4.

TABLE 4

The size distribution of the grafted carbon black (N220/AO-60) of Example 2 in acetone

| | Size (nm) | | | | |
|---|---|---|---|---|---|
| | 46 | 54 | 64 | 253 | 300 |
| Number (%) | 36 | 40 | 11 | 5 | 8 |

The particle size of the carbon black was also around 50 nm, being able to form stable liquid suspension in acetone which demonstrated its excellent dispersibility. The general properties of the carbon black were also very similar to those of Example 1.

The reactant of carbon black and AO-60 formed above was extracted with toluene for 72 hours to ensure the free AO-60 was completely removed. A sample of the carbon black after extraction was taken for measurement by Nicolet AVATAR360 FT-IR infrared spectrometer. The spectrum of FTIR-ATR showed the carbon black was grafted by AO-60.

At the same time, a thermogravimetric test for the above nanophase carbon black after extraction was carried out under nitrogen with SDT Q600 V5.0 Build 63 thermogravimeter (from TA Company, U.S.), where the temperature ranged from 20 to 900° C., the warming-up rate was 10K/min, and the gas purging rate was 80 ml/min. The final result showed that 7.3% of the AO-80 was grafted onto the surface of carbon black.

Example 3

The nanophase carbon black using light stabilizer LA-57 consisted of 100 parts by weight of carbon black ungrafted (N220, available from Mitsushita Chemical Corporation) and 80 parts by weight of LA-57 (available from ASAHI DENKA CO., LTD.).

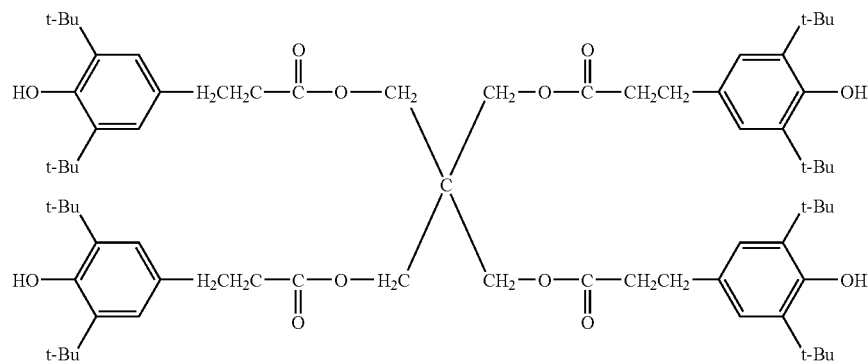

LA-57 is a trade name of a kind of light stabilizer that may produce active free radicals, with its melting point being 132° C., of which the standard name is 2,2,6,6-tetramethyl-4pyridyl-1,2,3,4-butanetetracarboxylate. The formula is illustrated as follows:

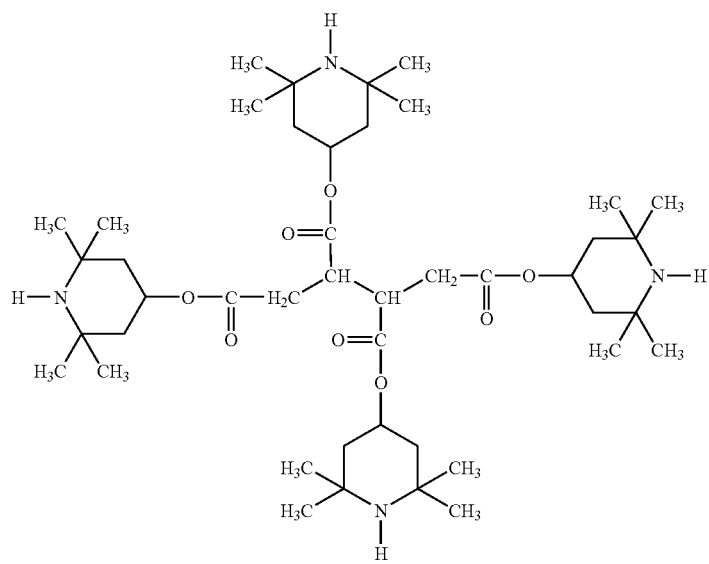

The reaction conditions were the same as those of Example 1 except that the set temperature of the Haake rheometer was 130° C. and the blending duration was extended to 40 minutes. The size distribution measured by laser light scattering sizemeter was illustrated in Table 5.

TABLE 5

The size distribution of the grafted carbon black (N220/LA-57) of Example 3 in acetone

| | Size (nm) | | | | |
|---|---|---|---|---|---|
| | 45 | 59 | 72 | 85 | 205 |
| Number (%) | 41 | 32 | 16 | 5 | 6 |

The particle size of the carbon black was below 100 nm with good mono-dispersibility, being able to form stable liquid suspension in acetone. The general properties of the carbon black were also very similar to those of Example 1.

At the same time, a thermogravimetric test for the above nanophase carbon black after extraction was carried out under nitrogen with SDT Q600 V5.0 Build 63 thermogravimeter (from TA Company, U.S.), where the temperature ranged from 20 to 900° C., the warming-up rate was 10K/min, and the gas purging rate was 80 ml/min. The final result showed that 36% of the LA-57 was grafted onto the surface of carbon black.

The nanophase N220/LA-57 grafting carbon black may disperse in de-ionized water under ultrasonic wave, to form a stable dispersion. The particle size of samples of the nanophase carbon black was measured in de-ionized water, and the size distribution was illustrated Table 6.

TABLE 6

The size distribution of the grafted carbon black of Example 3 in deionized water

| | Size (nm) | | | | | | |
|---|---|---|---|---|---|---|---|
| | 72 | 81 | 95 | 127 | 159 | 204 | 353 |
| Number (%) | 18 | 41 | 23 | 7 | 5 | 4 | 2 |

Example 4

The nanophase carbon black using antiager N300 consisted of 100 parts by weight of carbon black ungrafted (N220, available from Mitsushita Chemical Corporation) and 80 parts by weight of N300 (available from OUCHISHINKO CHEMICAL INDUSTRIAL CO., LTD).

N300 is a trade name of a kind of antiager that may produce active free radicals, with its melting point being 155° C., of which the standard name is 4-4'thio-bis-(3-methyl-6-tert-butyl-phenol). The formula is illustrated as follows:

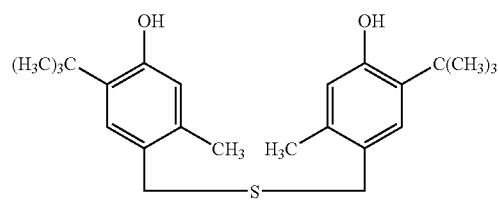

The reaction conditions were same as those of Example 1 except that the set temperature of the Haake rheometer was 170° C. and the blending duration was extended to 40 minutes. The size distribution measured by laser light scattering sizemeter was illustrated in Table 7.

TABLE 7

The size distribution of the grafted carbon black
(N220/N300) of Example 4 in acetone

| | Size (nm) | | | | | |
|---|---|---|---|---|---|---|
| | 60 | 63 | 66 | 70 | 182 | 191 |
| Number (%) | 21 | 36 | 29 | 12 | 1 | 1 |

The particle size of the carbon black was below 100 nm with good mono-dispersibility, being able to form stable liquid suspension in acetone. The general properties of the carbon black were also very similar to those of Example 1.

Example 5

The nanophase carbon black using antioxidant IRGANOX 1330 consisted of 100 parts by weight of carbon black ungrafted (Mogul-I, available from Cabot Corporation) and 80 parts by weight of IRGANOX 1330 (available from Ciba Specialty Chemicals).

IRGANOX 1330 is a trade name of a kind of antioxidant of phenols with steric hindrance that may produce active free radicals, with its melting point being 240-245° C., of which the standard name is 3,3',3',5,5',5'-hexatertbutyl-a,a',a'-(mesitylene,1,3,5-trimethylbenzene-2,4,6-trimethylbenzene)-tri-p-phenol. The formula is illustrated as follows:

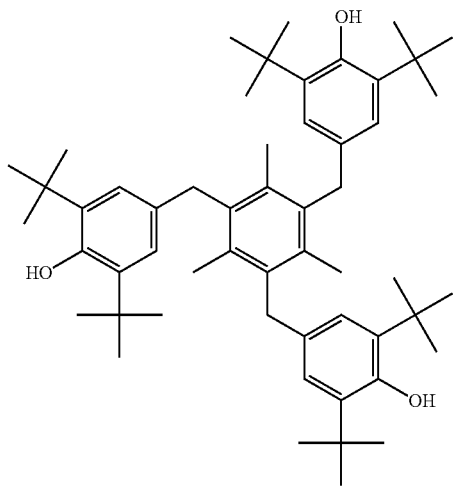

The reaction conditions were the same as those of Example 1 except that the set temperature of the Haake rheometer was 255° C. The size distribution measured by laser light scattering sizemeter was illustrated in Table 8.

TABLE 8

The size distribution of the grafted carbon black (mogul/IRGANOX 1330) of Example 5 in acetone

| | Size (nm) | | | |
|---|---|---|---|---|
| | 37 | 50 | 80 | 100 |
| Number (%) | 38 | 46 | 13 | 3 |

Example 6

The nanophase carbon black using antiager 4010NA consisted of 100 parts by weight of carbon black ungrafted (N220, available from Mitsushita Chemical Corporation) and 80 parts by weight of 4010NA (available from OUCHISHINKO CHEMICAL INDUSTRIAL CO., LTD).

4010NA is a trade name of a kind of antiager that may produce active free radicals, with its melting point being 80.5° C., of which the standard name is N-iso-propyl-N'-phenyl-p-diamine. The formula is illustrated as follows:

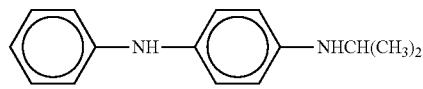

The reaction conditions were the same as those of Example 1 except that the set temperature of the Haake rheometer was 255° C. The size distribution measured by laser light scattering sizemeter was illustrated in Table 9.

TABLE 9

The size distribution of the grafted carbon black
(N220/4010NA) of Example 6 in acetone

| | Size (nm) | | | | | |
|---|---|---|---|---|---|---|
| | 57 | 62 | 71 | 84 | 121 | 176 |
| Number (%) | 21 | 34 | 26 | 11 | 5 | 3 |

Example 7

The nanophase carbon black using azo(2-methyl-4-carboxylbutyronitrile) consisted of 100 parts by weight of carbon black ungrafted (N220, available from Mitsushita Chemical Corporation) and 20 parts by weight of azo(2-methyl-4-carboxylbutyronitrile).

Azo(2-methyl-4-carboxylbutyronitrile) may produce active free radicals, with its decomposition temperature being 50-80° C. The formula is illustrated as follows:

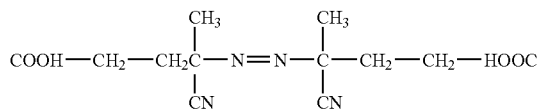

The reaction conditions were the same as those of Example 1 except that the set temperature of the Haake rheometer was 80° C. The size distribution measured by laser light scattering sizemeter was illustrated in Table 10.

TABLE 10

The size distribution of the grafted carbon black (N220/azo(2-methyl-4-carboxylbutyronitrile)) of Example 7 in acetone

| | Size (nm) | | | | |
|---|---|---|---|---|---|
| | 49 | 71 | 86 | 115 | 167 |
| Number (%) | 12 | 49 | 34 | 2 | 3 |

Azo(2-methyl-4-carboxylbutyronitrile) was broke down under heat and mechanical shearing force, and the fragment formed therefrom grafted onto the surface of the newly generated carbon black particles to prevent the particles from reaggregation, and thus the particle size decreased greatly.

Example 8

The nanophase carbon black using vulcanized agent consisted of 100 gram of carbon black ungrafted (N220, available from Mitsushita Chemical Corporation) and 80 gram of DTDM (available from Jinghai Chemical Plant, Shanghai).

DTDM is a trade name of a compound that may produce active free radicals, with its melting point being 124° C., of which the standard name is dithiodimorpholine. The formula is illustrated as follows:

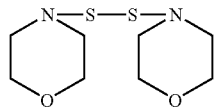

The experiment conditions are the same of those of Example 1.

TABLE 11

The size distribution of the grafted carbon black (N220/DTDM) in acetone

| | Size (nm) | | | | |
|---|---|---|---|---|---|
| | 51 | 71 | 107 | 114 | 183 |
| Number (%) | 24 | 41 | 22 | 9 | 4 |

DTDM is broken down under heat and mechanical shearing force, and the fragment formed therefrom graft to the surface of the carbon black particles to prevent them from reaggregating, therefore the particle size decrease greatly.

Example 9

The grafted carbon black using natural rubber consisted of 100 g of carbon black material ungrafted (N220, available from Mitsushita Chemical Corporation), 100 g of natural rubber (available from Ruiyang rubber chemicals, LLC, Shanghai), 1 g of peroxide (Jinlu chemicals, LLC., Shanghai).

100 g of carbon black material and 100 g natural rubber were blended in an internal mixer at the temperature of 160° C., and 1 g of peroxide was added dropwise, where the rotary speed of the screw in mixer was 60 rpm, and mixing time lasted for 30 minutes, then the carbon black grafted in situ was obtained.

In order to characterize the nanophase grafting carbon black, unreacted natural rubber needed to be removed, and the pure grafting carbon black was obtained as following: the above-mentioned reaction product of carbon black material and natural rubber was dissolved in toluene, stirred for at least 24 hours to get a dispersion, the dispersion was put into a high speed centrifuge (Medical Centrifuge Plant, Beijing) and was settled for 20 minutes, then the upper solution was removed, and the grafting carbon black deposit at the bottom of the container was re-dispersed in toluene for centrifuge separation until no natural rubber was observed in the upper solution.

A thermogravimetric test was carried out to the above grafting carbon black after centrifuge separation under nitrogen, and the grafting ratio of the grafting carbon black may be calculated from the thermogravimetric curve, where the calculating formulation is illustrated as follows:

$$\text{grafting ratio}(\%)=B/(A-B)\times 100\%$$

wherein, A refers to initial quantity of a grafting carbon black, B means the loss weight of grafting carbon black at 500° C. The grafting ratio of grafting carbon black measured by the above method was 35.6%.

1 part of carbon black material ungrafted and 1 part of grafted carbon black were put into the beakers respectively, then 100 parts of toluene was added. The beakers were placed in the ultrasonic cleaner (from Zhixin Instruments Company, Shanghai) to disperse in ultrasonic wave for 20 min. under a controlled temperature of 25° C., forming liquid carbon black dispersion. After that, a centrifugal sedimentation was carried out in centrifuge, to testify the extent of dispersion. 5 ml of sample of liquid dispersion was taken, and put into the centrifuge (4000 rpm), then the dispersion was taken out and its sedimentation status was observed every 5 minutes. As a result, the ungrafted carbon black deposited in 5 minutes; on the contrary, the suspension of the grafted carbon black was stable for a long time, achieving the purpose of this invention.

The particle sizes of carbon black (N220) grafted and ungrafted were tested respectively, the result was illustrated in FIG. 6, where the dispersant agent was acetone and the apparatus for measurement was laser nanometer granulometer (available from PSS Instrument Company, U.S.). From the figure, it was found that the particle size of grafted carbon black was much smaller than that of the ungrafted carbon black, because of mechanical force which destroyed carbon black aggregate and hindrance of grafting layer.

Example 10

The grafted carbon black using styrene-butadiene rubber consisted of 100 gram of carbon black material ungrafted (N220, available from Mitsushita Chemical Corporation), 200 gram of styrene-butadiene rubber (available from Ruiyang rubber chemicals, LLC, Shanghai), 1 gram of benzoyl peroxide (available from Jinlu chemicals, LLC., Shanghai).

The experiment conditions were the same as those of Example 9 except that the natural rubber was replaced by styrene-butadiene rubber.

The same method as that of Example 9 was used to test the grafting ratio, and the ratio was 56.3%.

The same method as that of Example 9 was used to test the particle size, the result was illustrated in FIG. 7, where the particle size of grafted carbon black was around 100 nm. During preparation, carbon black aggregates were destroyed by mechanical shearing force, at the same time, the rubber chain was grafted onto the surface of newly generated carbon black particles, preventing the particles from re-aggregation, therefore the particle size decreased greatly.

Carbon black, as a free radical capturer, when the organic molecules had organic small molecules, oligomers, polymers with low chemical bond energy, it would break to produce active free radicals under mechanical force, heat or other destructions. The radicals would be captured by carbon black and grafted on the carbon black, improving the dispersion of carbon black in mediums greatly.

Example 11

The nanophase carbon black using antioxidant AO-80 consisted of 100 parts by weight of pigment carbon black for ink (Raven 1035, Columbia Chemical Corporation) and 80 parts by weight of AO-80 (available from ASAHI DENKA CO., LTD.).

The inventor employed pigment carbon black suitable for ink to apply nanophase carbon black of the invention in the field of ink. All the experiment conditions were the same as those of Example 1, and the result (Table 12) testified that this method was suitable for carbon black for ink.

TABLE 12

The size distribution of the grafted carbon black (Raven 1035/AO-80) of Example 11 in acetone

| | Size (nm) | | | | | |
|---|---|---|---|---|---|---|
| | 63 | 66 | 69 | 72 | 169 | 177 |
| Number (%) | 27 | 35 | 27 | 8 | 2 | 1 |

A thermogravimetric test was carried out to the nanophase carbon black after extraction under nitrogen with SDT Q600 V5.0 Build 63 thermogravimeter (from TA Company, U.S.), where the temperature ranged from 20 to 900° C., the warming-up rate was 10° C./min, and the gas purging rate was 80 ml/min. The final result showed that 7.0% of the AO-80 was grafted onto the surface of carbon black.

Example 12

The nanophase carbon black using antioxidant AO-80 consisted of 100 parts by weight of the highly conductive carbon black (ENSACO 350G, available from Timcal Graphite CO., LTD) and 80 parts by weight of the AO-80 (available from ASAHI DENKA CO., LTD.).

The highly conductive carbon black had high structure, and its aggregate was very stable. The inventor employed highly conductive carbon black s to apply nanophase carbon black of the invention in the field of conductive coating and conductive composite materials. All the experiment conditions were the same as those of Example 1, and the result (Table 13) testified that this method was suitable for highly conductive carbon black.

TABLE 13

The size distribution of the grafted carbon black (ENSACO 350G/AO-80) of Example 12 in acetone

| | Size (nm) | | | | | |
|---|---|---|---|---|---|---|
| | 60 | 75 | 95 | 119 | 189 | 300 |
| Number (%) | 50 | 33 | 11 | 3 | 2 | 1 |

Example 13

The nanophase carbon black using antioxidant AO-80 and oxidized carbon black consisted of 100 parts by weight of oxidized carbon black (an oxidized product of Seast 300, called OCB, of which the specific surface area and oil absorption was shown in Table 14, available from Tohai Carbon Black Chemical CO., LTD) and 80 parts by weight of AO-80 (available from Asahikasei Fine Chemical CO., LTD).

TABLE 14

Oxidation effect of carbon black

| sample | specific surface area of Nitrogen absorption (m2/g) | DBP absorption (ml/100 g) | pH |
|---|---|---|---|
| Seast 300 | 84 | 75 | 7.9 |
| OCB | 123 | 122 | 3.1 |

The oxidized carbon black had more functional groups on its surface, which was beneficial to the grafting reaction. Furthermore, its specific surface area was comparatively large, so that the carbon black had a high structure and its aggregates was easier to be destructed under identical mixing conditions. The inventor employed oxidized carbon black, with other experiment conditions the same as those of Example 1. The result (Table 15) showed that the grafting product of the oxidized carbon black not only had small particle size, but also had good dispersion, indicating that the effect of grafting modification using oxidized carbon black was better than that of grafting modification using common carbon black.

TABLE 15

The size distribution of the grafted carbon black (Seast 300/AO-80) of Example 13 in acetone

| | Size (nm) | | |
|---|---|---|---|
| | 42 | 180 | 210 |
| Number (%) | 98 | 1 | 1 |

Example 14

The nanophase carbon black containing antioxidant AO-80 and a third component consisted of 100 parts by weight of carbon black ungrafted (N220, available from Mitsushita Chemical Corporation), 80 parts by weight of AO-80 (available from ASAHI DENKA CO., LTD.), and 40 parts by weight of TNP (OUCHISHINKO CHEMICAL INDUSTRIAL CO., LTD).

All the experiment conditions were the same as those of Example 1 except that the inventor added a third component of TNP into the system, of which the formula was shown as follows. It was found that the addition of the third component of TNP (refer to Table 16) promoted the effect of grafting modification on carbon black.

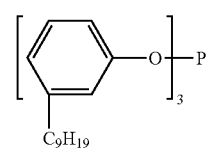

TABLE 16

The size distribution of the carbon black grafted
(N220/AO-80/TNP) of Example 14 in acetone

| | Size (nm) | | | | |
|---|---|---|---|---|---|
| | 44 | 52 | 61 | 190 | 210 |
| Number (%) | 40 | 38 | 20 | 1 | 1 |

Example 15

The inventiveness of the present invention is partly represented where the organic compound is grafted in situ during the time that carbon aggregates are destroyed to form primary particles under vigorous shearing force. The experiment conditions were the same as those of Example 2 except that the mixer was changed to MD50-100 continuous internal mixer (from Keya Mechanical CO., LTD, Nanjing). The size distribution tested by the laser scattering granulometer was shown in Table 17, the result showed that the continuous internal mixer for large-scale production was also effective in the production of nanophase carbon black.

TABLE 17

The size distribution of the carbon black grafted
(N220/AO-60) of Example 15 in acetone

| | Size (nm) | | | | | |
|---|---|---|---|---|---|---|
| | 56 | 117 | 141 | 170 | 204 | 428 |
| Number (%) | 78 | 8 | 7 | 4 | 2 | 1 |

Example 16

The experiment conditions were the same as those of Example 1 except that 40 parts of AO-80 was added, which was grafted in Haake device, then its particle size was measured by laser granulometer, with the result illustrated as follows:

TABLE 18

The size distribution of the grafted carbon
black of Example 16 in acetone

| | Size (nm) | | | | | | |
|---|---|---|---|---|---|---|---|
| | 59 | 66 | 74 | 142 | 159 | 177 | 198 |
| Number (%) | 46 | 32 | 14 | 3 | 3 | 1 | 1 |

The resulting carbon black dispersed well in acetone, being able to form stable dispersive suspension, and the general properties of the carbon black have the same tendency as that of Example 1. At the same time, a thermogravimetric test was carried out to the above nanophase carbon black after extraction under nitrogen with SDT Q600 V5.0 Build 63 thermogravimeter (from TA Company, U.S.), where the temperature ranged from 20 to 900° C., the warming-up rate was 10K/min, and the gas purging rate was 80 ml/min. The final result showed that 6.9% of the AO-80 was grafted onto the surface of carbon black.

Example 17

3 parts (50 g each) of PMMA (polymethyl methacrylate) were weighed, and were put into three Erlenmeyer flask, to which 200 ml of acetone was added respectively to dissolve the PMMA. After complete dissolution of the PMMA, 1 g of grafted nanophase carbon black of Example 1 and 1 g of unmodified carbon black, were added respectively, to two of the above flasks, which were treated by ultrasonic dispersion for 30 minutes, to give PMMA/GCB (100/2) and PMMA/CB (100/2) dispersion. The dispersion was coated onto surface of glass substrates, to give PMMA/GCB (100/2) and PMMA/CB (100/2) film coatings after the volatilization of the solvents in dispersion. At the same time, the PMMA solution without carbon black was coated. The resulting films were measured by UV-Visible Spectrophotometer in a wave range from 200 to 800 nm, to evaluate the effect of the carbon black on absorption of ultraviolet light. The result was illustrated in FIG. 8.

It was seen that the PMMA/GCB (100/2) film containing grafted nanophase carbon black of the invention had a strong absorption in the ultraviolet wave range, where the absorption ratio reached 60-70%, four times of that of a PMMA film. It can be seen that the grafted nanophase carbon black had a good absorption to ultraviolet light.

Example 18

0.01 g/l dispersion in ethanol of carbon black grafted with AO-80 and ungrafted carbon black, and 0.01 g/l dispersion in water of LA57 grafted carbon black and ungrafted carbon black were prepared respectively, and then treated with ultrasonic wave for 15 min, followed by UV-Visible spectrum test in a range from 200 to 800 nm, and the result was illustrated in FIG. 9 and FIG. 10.

At the same concentration, the absorption ratio of carbon black grafted with AO-80 was greater than that of ungrafted carbon black in the whole range of wavelength, indicating that carbon black grafted with AO-80 had better dispersibility in ethanol than ungrafted carbon black. The absorbance of carbon black grafted with LA57 was lower than that of ungrafted carbon black in the wave length of visible light, however was greater than that of ungrafted carbon black in the wave length of ultraviolet light, indicating that carbon black grafted with LA57 had excellent ultraviolet shielding.

Example 19

In a Haake rheometer, 40 g of ungrafted carbon black and 32 g of AO-80 small molecular antioxidant were blended, where the temperature was 150° C., the rotary speed of the rotor was 50 rpm, and the blending time lasted for 20 min. 0.25 g, 0.5 g, 1 g, 1.5 g, 2 g, 2.5 g, 5 g, 7.5 g, 10 g of grafted nanophase carbon black and ungrafted carbon black were weighed respectively, then 50 g of polycarbonate, 200 g of solvent were weighed, and the polycarbonate was dissolve in the solvent first to give a solution, to which the carbon black was added, then dispersed under ultrasonic wave for 10 min. The dispersion was coated on the surface of glass substrates, until the solvent was volatilized, to give polycarbonate film filled with different amount of carbon black. The surface conductivity of the films was measured, with the result illustrated in FIG. 11. In the case of ungrafted carbon black, when the addition amount reached 15 wt % or more can a certain antistatic effect be obtained, however in case of grafted nanophase carbon black, when the addition amount reached 2 wt % can good antistatic effect be obtained.

The transparency ratio of the 0.01 mm film at the wavelength of 500 nm (wavelength of the strongest visible light) was measured by a UV-Visible Spectrophotometer, with the result illustrated in FIG. 12. Since ungrafted carbon black existed in the form of aggregates in polymers, which reflected and absorbed most visible light, so the transparency ratio decreased sharply along with the increase of the filling amount of carbon black, and until the filling amount reached 3 wt %, the film was essentially opaque. However, in case of grafted carbon black, with particle size below 100 nm, the carbon black reflected much less visible light and its small molecule grafting layer may shield a certain part of carbon black from absorption of light by refraction, to sustain high transparency, for example, even if the filling amount reached 5 wt %, the transparency ratio was over 50%.

To sum up, when the filling amount of the grafted nanophase carbon black was 2 wt %, its resistivity was less than $10^8$ Ω/square, and the transparency ratio was still more than 80%, to achieve the requirement on both transparency and conductivity of this invention.

Example 20

In a Haake rheometer, 40 g of ungrafted carbon black and 32 g of AO-80 small molecular antioxidant were blended, where the temperature was 150° C., the rotary speed of the rotor was 50 rpm, and the blending time lasted for 20 min. 2.5 g of grafted carbon black (common carbon black) and 47.5 g of polypropylene were weighed, the mixture of them was blend in a roll mixer, where the roll temperature was 155° C., the mixing time lasted for 20 min. 5.8 g of pure polypropylene, polypropylene composite filled with common carbon black and polypropylene composite filled with grafted carbon black were weighed respectively, of which their melting temperatures were measured by DSC, obtaining melting curves of the 3 samples under the same heat history. The melting temperature of polypropylene filled with grafted carbon black was 175.4° C., which was about 10° C. higher than that of pure polypropylene. The result was illustrated in FIG. 13 and FIG. 14, and the mechanical properties were shown in Table 19.

TABLE 19

Mechanical properties of PP, PP/1 wt % GCB & PP/1 wt % CB

| sample | tensile strength (MPa) | elongation at break (%) | impactstrength (kJ · m$^{-2}$) | temperature of heat deformation (° C.) |
|---|---|---|---|---|
| PP | 35 | 206 | 3.5 | 119.4 |
| PP/5% CB | 37.5 | 167 | 2.9 | 124.3 |
| PP/5% GCB | 39 | 332 | 4.6 | 135.5 |

Example 21

PP/1 wt % GCB and PP/1 wt % CB composite material were prepared by the same method as that of Example 20. In a DSC device, the temperature was raised to 200° C. with a warming-up rate of 10° C./min, then the temperature was lasted for 5 min, then under the warming-up rate of 1, 2.5, 5, 7.5, and 10° C./min, to get a non-isothermal crystallization curve. The result was illustrated in FIG. 15 and FIG. 16. It was understood that the addition of only 1 wt % of GCB made the peak value of crystalline peak shift to the high temperature, and the half-crystallization time reduced. It was therefore appreciated that GCB had good heterogeneous nucleation to make PP crystallize under higher temperature, which may reduce formation period and increase production period.

Example 22

PE/1 wt % GCB and PE/1 wt % CB composite were prepared by the same method as that of Example 20. Apparently, the PE filled with grafted carbon black had more ultraviolet absorption than that filled with common carbon black, demonstrating that grafted carbon black possessed better dispersibility in PE matrix than common carbon black, and the result was shown in FIG. 17 and FIG. 18.

TABLE 20

Heat deformation temperature of PE, PE/1 wt % GCB and PE/1 wt % CB

| sample | PE | PE/1 wt % CB | PE/1 wt % GCB |
|---|---|---|---|
| heat deformation temperature (° C.) | 80 | 83 | 95 |

Example 23

(1) Preparation of Reinforcing Rubber 2# of the Invention and Comparative Sample 1#

According to the formulation of Table 21, to the natural rubber, the grafted carbon black of Example 10 and other assistant agents were added, and the mixture was blended for 5-20 min in a roll mixer, and the resulting blend was placed overnight, then vulcanized for 15 min at 140° C. The mechanical properties of the resulting product, reinforcing rubber 2# were listed in Table 22.

The comparative sample 1# of reinforcing rubber was prepared by the same method as that of reinforcing rubber 2#. In the formulation, the rubber contents of both samples were identical. Because the grafted carbon black of Example 9 contained 50% of rubber, the rubber content of 1# and 2# samples were identical. The difference was, the reinforcing agent used was ungrafted carbon black material.

It was seen from the table that, carbon black grafted in situ with degradation natural rubber had good reinforcing effect on natural rubber, of which the tensile strength, 300% stress at set elongation, rigidity increased remarkably, and elongation at break was decreased which did not affect the high elasticity of rubber.

TABLE 21

Basic formulation of rubber material

|  | 1# | 2# |
|---|---|---|
| Natural rubber (NR) (g) | 100 | 65 |
| Carbon black (N220) (g) | 35 |  |
| Carbon black grafted with natural rubber (g) |  | 70 |
| Zinc oxide (g) | 5 | 5 |
| Stearic acid (g) | 2 | 2 |
| Antioxidant AO-20 (available from ASAHI DENKA CO., LTD.) (g) | 2 | 2 |
| accelerator CZ (cycloethylbenzothiazolyl sulfenamide(g) | 0.4 | 0.4 |
| accelerator DM (dibenzothiazolyl disulfide) (g) | 1 | 1 |
| Sulphur (g) | 2.5 | 2.5 |
| Total (g) | 147.9 | 147.9 |

TABLE 22

Properties of reinforced natural rubber

|  | 1# | 2# |
|---|---|---|
| Shore A hardness | 57 | 60 |
| tensile strength (MPa) | 23.7 | 31.3 |
| stress at 300% strain (Mpa) | 10.2 | 15.0 |

TABLE 22-continued

Properties of reinforced natural rubber

|  | 1# | 2# |
| --- | --- | --- |
| elongation at break (%) | 563 | 524 |
| tear strength (KN/m) | 66.7 | 93.6 |

Example 24

Reinforcing rubber 4# was prepared by the same method as that of Example 20 except that the grafted carbon black of Example 10 was used, and the rubber used was styrene-butadiene rubber.

The comparative sample 3# of reinforcing rubber was prepared by the same method as that of Example 23. The sample 3# differed from sample 4# in that the reinforcing agent used in sample 3# was ungrafted carbon black material.

TABLE 23

Basic formulation of rubber material

|  | 3# | 4# |
| --- | --- | --- |
| styrene butadiene rubber (SBR) (g) | 100 | 30 |
| carbon black material (N220) (g) | 35 | 0 |
| carbon black grafted by SBR (g) | 0 | 105 |
| Zinc oxide(g) | 5 | 5 |
| stearic acid (g) | 2 | 2 |
| AO-20 (g) | 2 | 2 |
| accelerator CZ (g) | 0.4 | 0.4 |
| accelerator DM (g) | 1 | 1 |
| sulphur (g) | 2.5 | 2.5 |
| total (g) | 147.9 | 147.9 |

TABLE 24

Properties of reinforced styrene-butadiene rubber

|  | 3# | 4# |
| --- | --- | --- |
| Shore A hardness | 57 | 61 |
| tensile strength (MPa) | 22.3 | 29.8 |
| stress at 300% strain (MPa) | 8.4 | 13.5 |
| elongation at break (%) | 609 | 589 |
| tear strength (KN/m) | 53.2 | 78.5 |

Example 25

The nanophase carbon black using antioxidant AO-80 consisted of 100 parts by weight of carbon black ungrafted (N220, available from Lishi Chemical CO. LTD., Shanghai) and 80 parts by weight of AO-80 (available from ASAHI DENKA CO., LTD.).

The carbon black and AO-80 were melt blended at the temperature of 140° C. which was higher than the melting point of AO-80 (125° C.) for 60 minutes, in Haake rheometer of which the rotational speed was 60 rpm.;

The resulting product of carbon black and AO-80 was filtered and dried for use of rubber-reinforcing filler. The formulation of vulcanized rubber was illustrated as Table 25.

TABLE 25

Formulation of rubber reinforced by original carbon black and grafted carbon black

| Name of material | NR-N220 | NR-GCB |
| --- | --- | --- |
| NR (g) | 100 | 100 |
| zinc oxide (g) | 5 | 5 |
| sulphur (g) | 2.5 | 2.5 |
| stearic acid (g) | 2 | 2 |
| accelerator CZ (g) | 0.4 | 0.4 |
| accelerator DM (g) | 1 | 1 |
| carbon black (g) | 30 | 0 |
| grafted carbon black (g) | 0 | 30 |

The materials of the above formulation was compounded and blended in a cold twin-roll open mixer, and the blend obtained was vulcanized at a condition of 140° C.×30 min. The resulting product was then press molded at a $10^5$ ton plate sheeter.

The sample was tested according to the provisions of the national standard GH528-76, where a part of a vulcanized rubber sheet of 2.0±0.3 mm thickness was cut into a dumb-bell shape, which was stretched at a stretching speed of 500±10 mm/min at 23° C., and its elongation of the stretched part was measured until breakage, and the measured tensile strength and elongation at break was illustrated in Table 26, where the hardness was calculated in Shore hardness. The tear sample was 2.0±0.3 mm thick, and was cut into a rectangular shape to be stretched at a speed of 500±10 mm/min until teared up, and the tear strength was calculated.

TABLE 26

Mechanical properties of vulcanized rubber filled with original carbon black and grafted carbon black

| sample number | NR-N220 | NR-GCB |
| --- | --- | --- |
| Shore A hardness | 49 | 47 |
| tensile strength (MPa) | 23.7 | 23.8 |
| elongation at break (%) | 704.7 | 631.5 |
| stress at 300% strain (MPa) | 5.3 | 5.4 |
| tear strength (KN/m) | 83.3 | 68.4 |

Example 26

The nanophase carbon black using light stabilizer LA-57 consisted of 100 parts by weight of carbon black ungrafted (N220, available from Lishi Chemical Co. LTD., Shanghai) and 80 parts by weight of LA-57 (available from ASAHI DENKA CO., LTD.).

The carbon black and LA-57 were melt blended at the temperature of 140° C. which was higher than the melting point of LA-57 (132° C.) for 30 minutes, in Haake rheometer of which the rotational speed was 60 rpm.

The resulting product of carbon black and LA-57 was filtered and dried for use as rubber-reinforcing filler. The formulation of vulcanized rubber was illustrated in Table 25 of Example 25.

The sample was tested according to the provisions of the national standard GH528-76, where a part of a vulcanized rubber sheet of 2.0±0.3 mm thickness was cut in a dumb-bell shape, which was stretched at a stretching speed of 500±10 mm/min at 23° C., and its elongation of the stretched part was measured until breakage, and the measured tensile strength and elongation at break was illustrated in Table 27, where the hardness is calculated in Shore hardness. The tear sample is 2.0±0.3 mm thick, and was cut to a rectangular shape to be stretched at a speed of 500±10 mm/min until teared up, and the tear strength was calculated.

TABLE 27

Mechanical properties of vulcanized rubber filled with original carbon black and grafted carbon black

| sample number | NR-N220 | NR-GCB |
|---|---|---|
| Shore A hardness | 49 | 45 |
| tensile strength (MPa) | 23.7 | 25.0 |
| elongation at break (%) | 704.7 | 764.8 |
| 300% stress at set elongation (MPa) | 5.3 | 3.9 |
| tear strength (N/cm) | 83.3 | 65.3 |

The tensile strength and elongation at break of the resulting vulcanized rubber filled with grafted carbon black improved to a certain extent, demonstrating that the grafting layer of organic small molecules had a certain reinforcement effect on carbon black reinforced rubber.

The DMA curve of the sample was shown in FIG. 19 and FIG. 20, where a temperature dependency test was carried out to the sample in stretch mode at −80° C.-100° C. under 11 Hz. The vulcanized rubber filled with grafted carbon black had higher modulus value and lower tan δ value at high temperature, that is, the rolling resistance of the rubber, when be used as tread rubber, is comparatively small under high temperature.

A Payne effect test was carried out to the sample (FIG. 21), where the rubber filled with grafted carbon black was weaker than that filled with ungrafted carbon black, indicating that it possessed good dispersion in matrix. The test mode was set in shear mode under room temperature.

Example 27

The nanophase carbon black prepared in Example 3 had much greater dispersibility in water since the grafting compound LA57 used was hydrophilic, so the grafted carbon black may be used in water paint, where the formulation were shown in Table 28.

The starting materials included carbon black (N220, Mit-sushita Chemical Corporation), water acrylate (BD809, Xinda Chemical CO. LTD., Shanghai), 1-butanol (from Jinlu chemicals, LLC., Shanghai).

TABLE 28

Formulation of conductive coatings

| | 1# | 2# |
|---|---|---|
| carbon black (N220)(g) | 15 | 0 |
| grafted carbon black (g) | 0 | 15 |
| water acrylate (g) | 100 | 100 |
| water(g) | 50 | 50 |
| 1-butanol (g) | 10 | 10 |

The preparation of the coatings was as follows: all the components were ground by hand and premixed, then the mixture was ball milled for 6 hours in ball grinder. The properties of the coatings were characterized. The result showed that the coatings containing grafted nanophase carbon black had considerable improvement, compared with the coatings filled with ungrafted carbon black, in glossiness, adhesion, fluidity, etc., where the glossiness was tested on a Aluminum plate according to GB 1743-79 standard, and the adhesiveness was tested on Aluminum plate according to GB/T 9286-1998 standard, the surface resistivity was tested by PTC megameter.

TABLE 29

Comparison of the properties of the samples of Example 14

| | fluidity | glossiness | adhesion | surface resistivity (Ω/sq) |
|---|---|---|---|---|
| 1# | not good | 50.7% | 4 level | 1.06E+05 |
| 2# | good | 58.2% | 1 level | 1.15E+08 |

Effect of the Invention

In this invention, the organic compounds such as the phenols, the amines, and the organic compounds that may break into free radicals under mechanical shearing force or exposure to magnetic wave, ozone, or oxidants, may blend with carbon black having free radicals at a mixing apparatus which may produce a certain shearing force, and graft reaction may be carried out directly at a temperature which is higher than the melting point of the organic compounds having free radicals, to give nanophase carbon black covered with organic compound. The method of synthesis of such carbon black has the virtues of simple process, without the need of solvent, low cost, being pollution-free, and being able to continuous scale production.

The grafted carbon black may be used as conductive additive for preparing new transparent conductive materials based on polymers, which is flexible and resistant to bending, environment independent, stable to heat, low-cost, simple and suitable for continuous scale production.

The nanophase carbon black grafted with organic compounds is suitable for various plastics, and can improve their mechanical properties, raise their melting points, increase the crystalline temperature of hypocrystalline plastics, reduce their crystalline period, facilitate their handling, and prolong light sensation, heat sensation and aging resistance of the articles made therefrom. And the masterbatch prepared therefrom is suitable for pigmentation on various plastics, which has the virtues of low addition, good dispersion in plastics matrix, strong pigmentation, and high glossiness.

The addition of grafted nanophase carbon black into a rubber matrix may significantly improve the mechanical properties of the rubber such as tensile strength, 300% stress at set elongation, rigidity, to give rubber articles with good performance.

The grafted nanophase carbon black may be used to prepare conductive water coatings, and the resulting product has improvement not only in dispersibility, dispersing stability, but also in glossiness, adhesions, fluidity and the like.

The grafted nanophase carbon black has excellent ultraviolet absorption effect, and may be widely applied in the field of uvioresistanceor ultraviolet screen.

The grafted nanophase carbon black has small particle size, where the surface of the particles bears charge and uneasy to aggregate, so it may be used directly as black particles suitable for "electric paper" display, characterizing in high resolution, long life, etc.

All the documents cited herein are incorporated into the invention as reference, as if each of them is individually incorporated. Further, it would be appreciated that, in the above teaching of the invention, the skilled in the art could make certain changes or modifications to the invention, and these equivalents would still be within the scope of the invention defined by the appended claims of the present application.

What is claimed is:

1. A nanophase carbon black grafted with organic compounds, comprising:
   (a) a first component: 100 parts by weight of ungrafted carbon black particles; and
   (b) a second component: 5-300 parts by weight of at least one organic compound having or producing free radicals, wherein the at least one organic compound is grafted onto the surface of the carbon black particles,
   wherein the molecular weight of the at least one organic compound is 100-10000, and said nanophase carbon black after grafting has a particle size of 1-100 nm;
   wherein the nanophase carbon black grafted with organic compounds is prepared by a method comprising the following steps:
   applying a mechanical shearing force in the presence of ungrafted carbon black and at least one organic compound having or producing free radicals
   at a temperature above the melting point of the at least one organic compound having and producing free radicals;
   wherein the mechanical shearing force is applied so as to allow breakage of a solid form of the ungrafted carbon black, production of free radicals on the surface of the ungrafted carbon black and breakage of the at least one organic compound to produce free radicals;
   wherein the iodine absorption value of said grafted carbon black is 30-80 g/kg, its dibutyl phthalate (DBP) absorption value is 50-100 ml/100 g, and its cetyltrimethyl ammonium bromide (CTAB) absorptive surface area is 50-100 m$^2$.

2. The nanophase carbon black of claim 1, wherein there are 100 parts by weight of original carbon black and 10-200 parts by weight of the organic compound grafted in situ.

3. The nanophase carbon black of claim 1, wherein said ungrafted carbon black particles have an increased oxygen and hydrogen content after gas phase oxidation or liquid phase oxidation;
   or said ungrafted carbon black particles are conductive carbon black, reinforcing carbon black or pigmentation carbon black.

4. The nanophase carbon black of claim 1, wherein the oxygen content, calculated by weight, is more than 0.1% of the total weight of the carbon black substrate, and the hydrogen content, calculated by weight, is more than 0.2% of the total weight of the carbon black substrate.

5. The nanophase carbon black of claim 1, wherein the at least one organic compound is-selected from the group consisting of:
   (i) phenols;
   (ii) amines;
   (iii) phenols, amines, sulfur-containing organic compounds, peroxides, azo-compounds, halogen-containing organic compounds and any other small molecular organic compounds, oligomers, or polymers that can be broken into an organic compound having or producing free radicals under heat or mechanical shearing force; and
   (iv) phenols, amines, sulfur-containing organic compounds, peroxides, azo-compounds, halogen-containing organic compounds and any other small molecular-weight organic compounds, oligomers, or polymers that can be broken into an organic compound having or producing free radicals under heat or mechanical shearing force and additional exposure to magnetic irradiation, such as ultrasonic wave, microwave, ultraviolet, or infrared, or to oxidation with ozone, or to oxidation with any other oxidants.

6. The nanophase carbon black of claim 5, wherein the at least one organic compound is selected from the following:

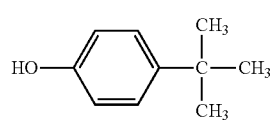
(1)

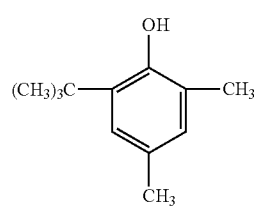
(2)

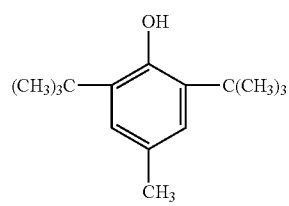
(3)

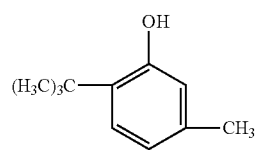
(4)

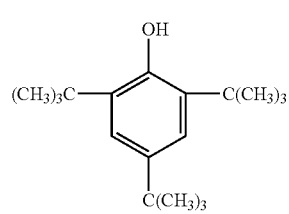
(5)

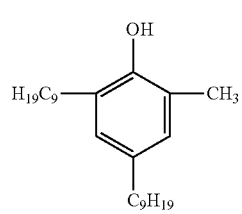
(7)

-continued
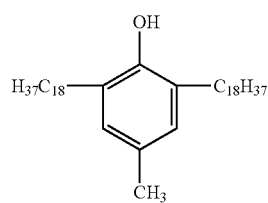 (8)
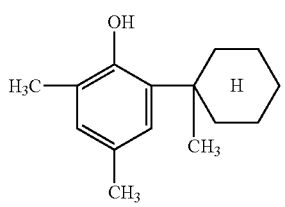 (9)
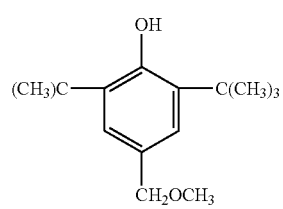 (10)
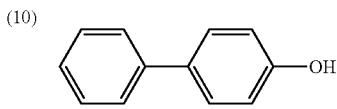 (11)
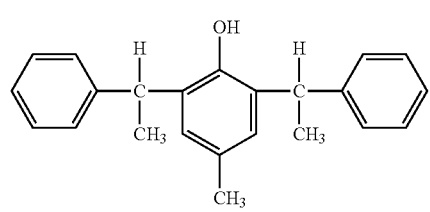 (13)
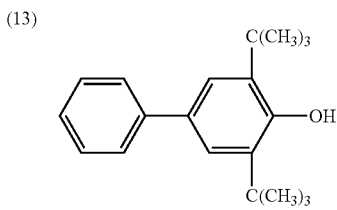 (14)
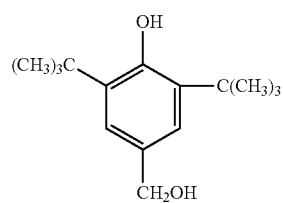 (15)
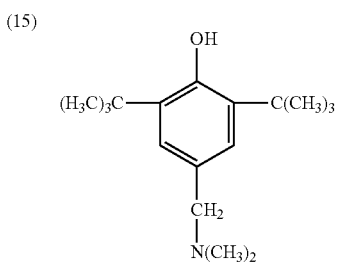 (16)
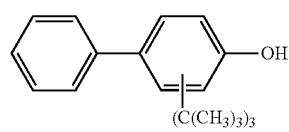 (17)
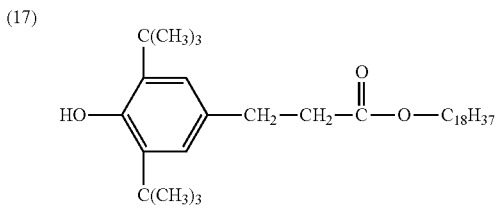 (18)
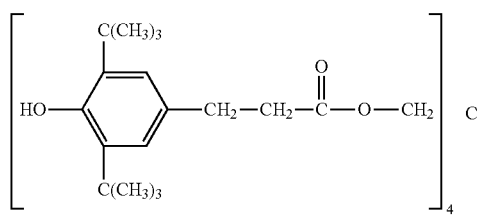 (19)
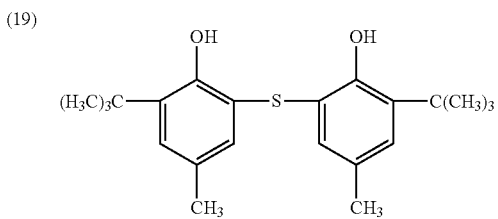 (20)
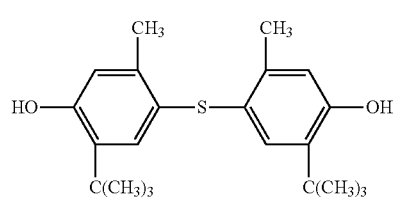 (21)
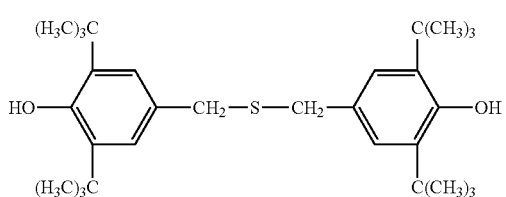 (22)

-continued
(23)
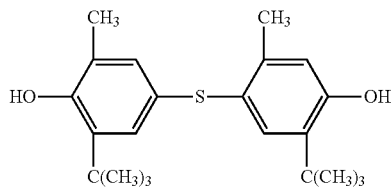
(24)
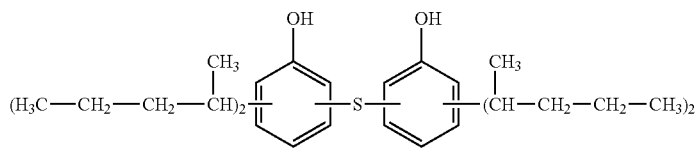
(25)
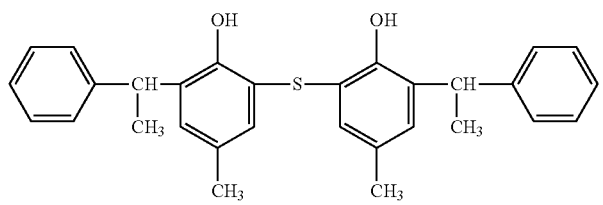
(26)
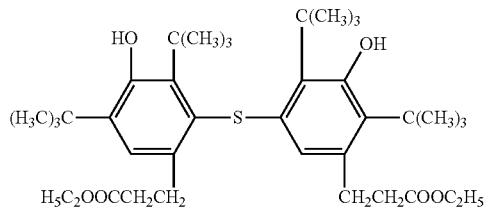
(27)
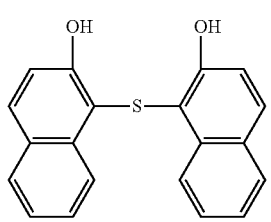
(28)
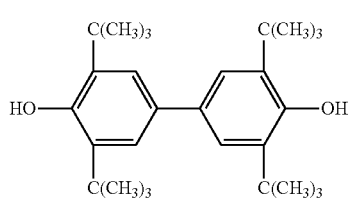
(29)
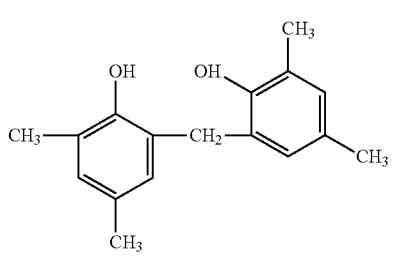
(30)
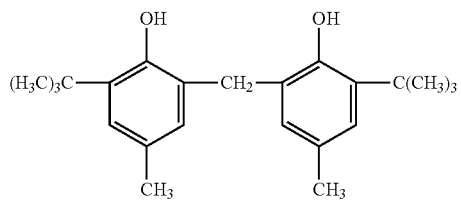
(31)
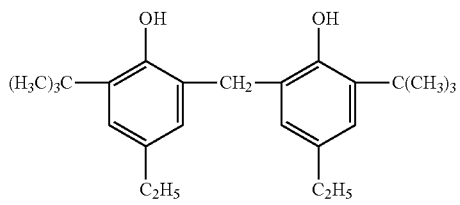
(32)
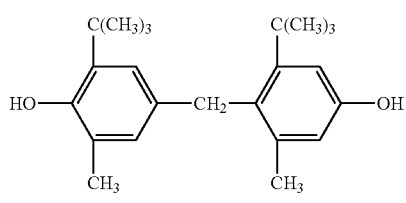
(33)
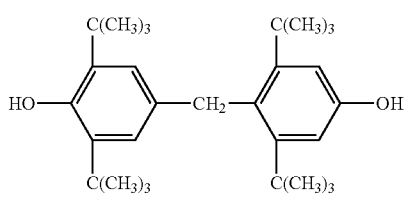
(34)
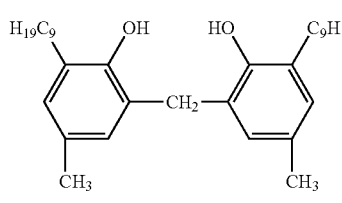
(35)
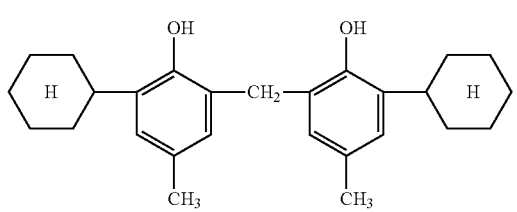

-continued
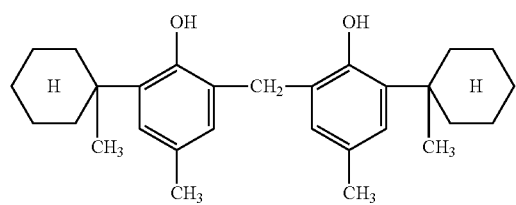 (36)
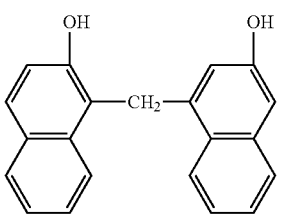 (37)
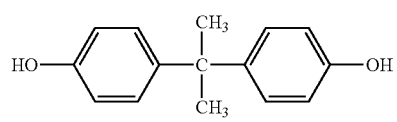 (38)
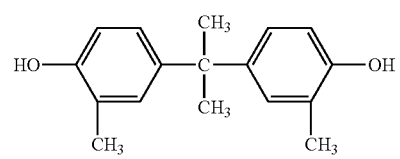 (39)
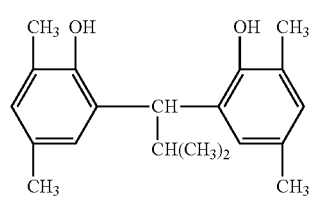 (40)
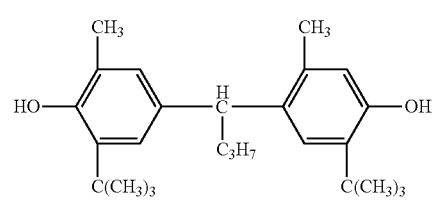 (41)
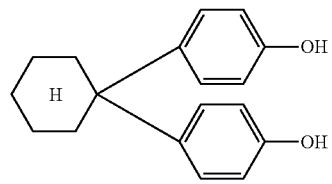 (42)
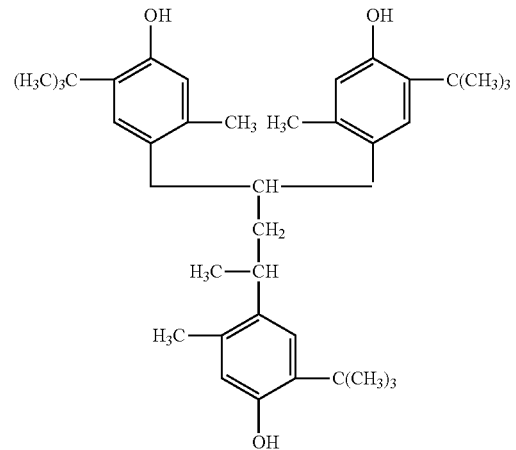 (43)
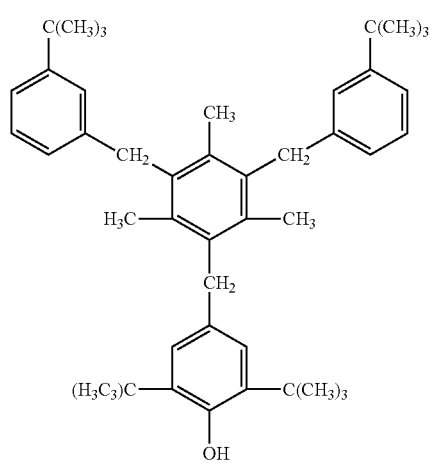 (44)
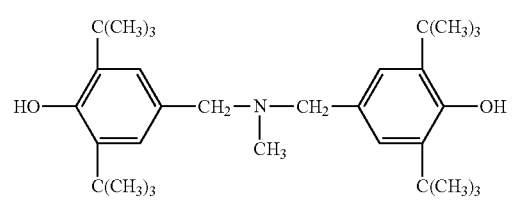 (45)

-continued
(46)
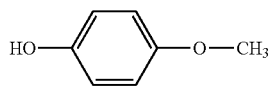
(47)
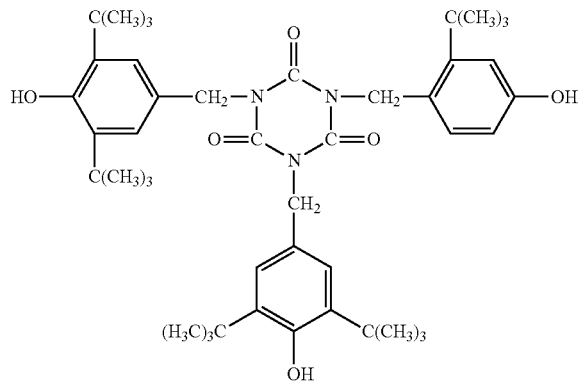
(49)
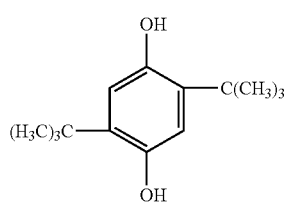
(50)
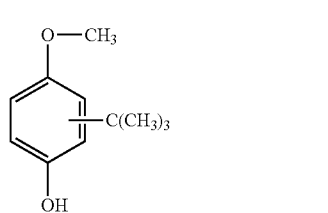
(51)
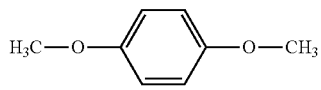
(52)
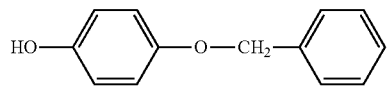
(53)
H₃C—O—⟨⟩—O—CH₃
(54)
HO—⟨⟩—O—CH₂—⟨⟩
(55)
⟨⟩—CH₂—O—⟨⟩—O—CH₂—⟨⟩
(56)
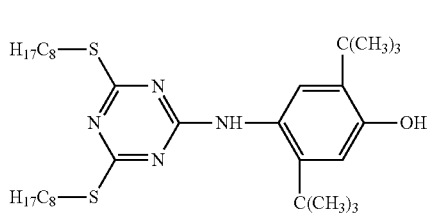
(57)
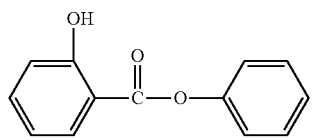
(58)
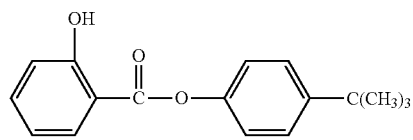
(59)
(60)

-continued
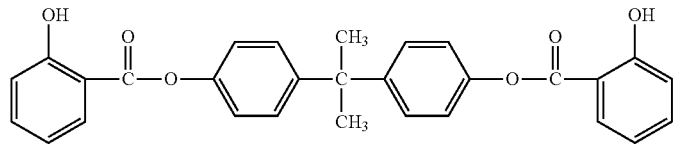
(61)
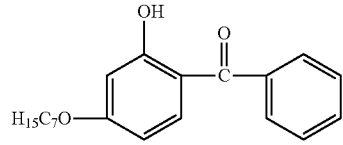
(62)
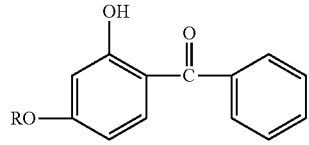
(63)
R = C₇H₁₅ ~ C₉H₁₉
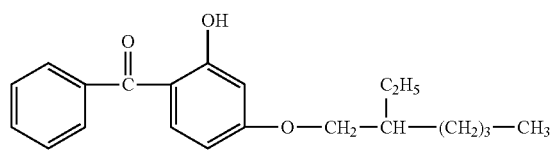
(64)
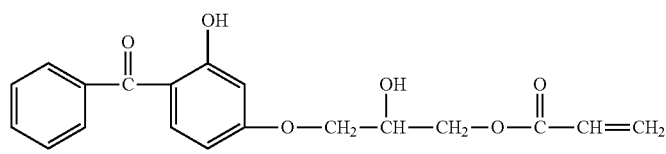
(65)
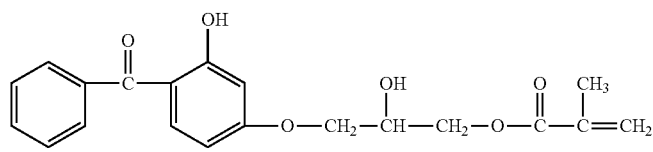
(66)
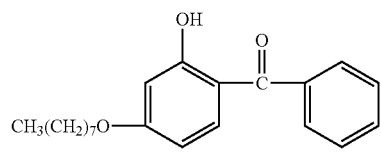
(67)
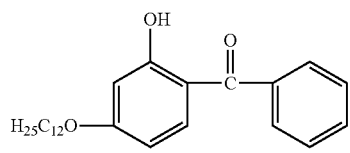
(68)
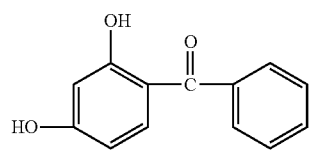
(69)
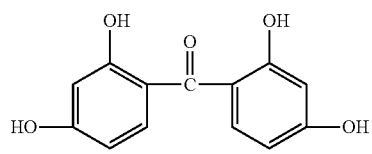
(70)
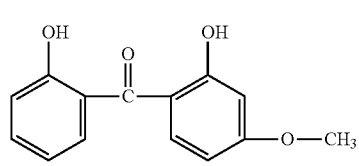
(71)
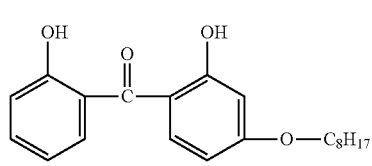
(72)
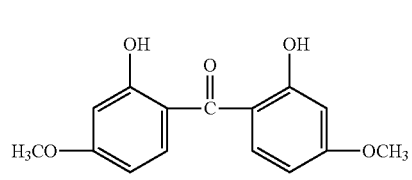
(73)
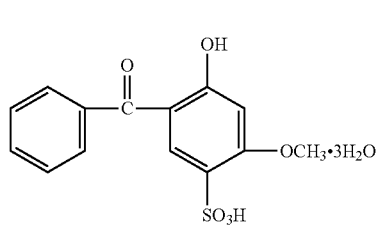
(74)

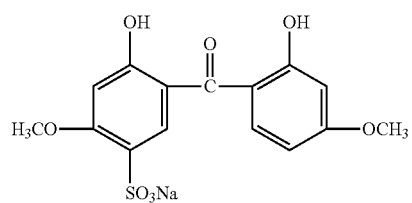 (75)
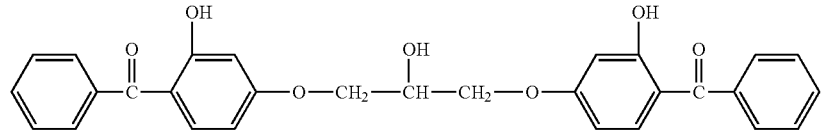 (76)
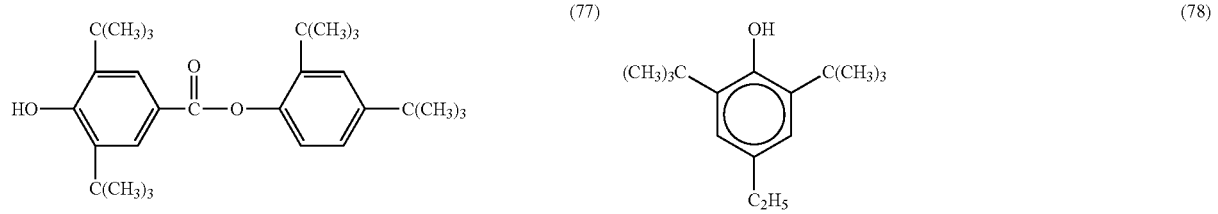 (77) (78)
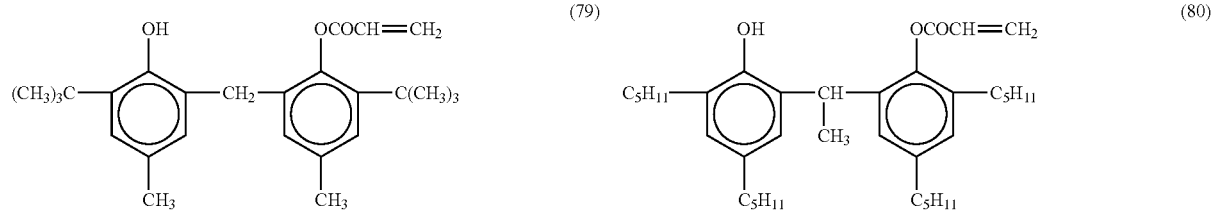 (79) (80)
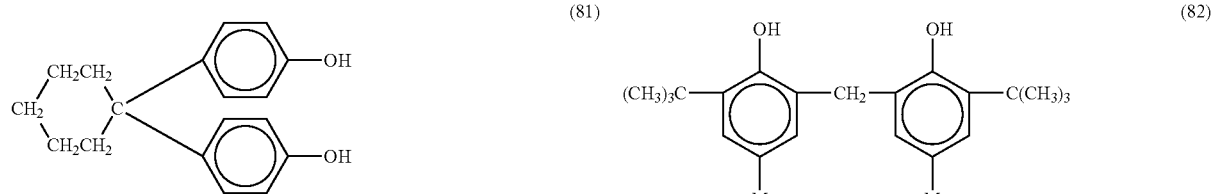 (81) (82)
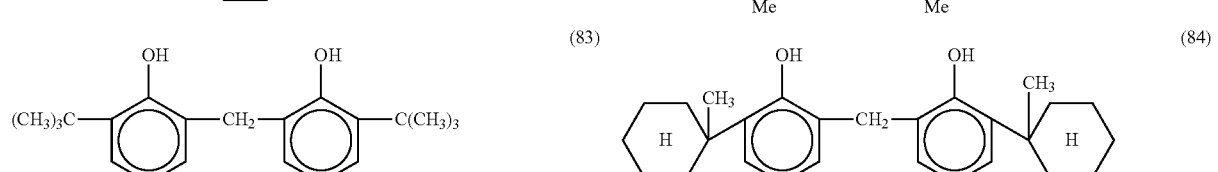 (83) (84)
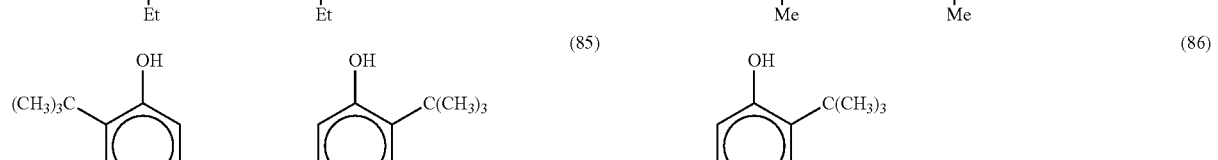 (85) (86)
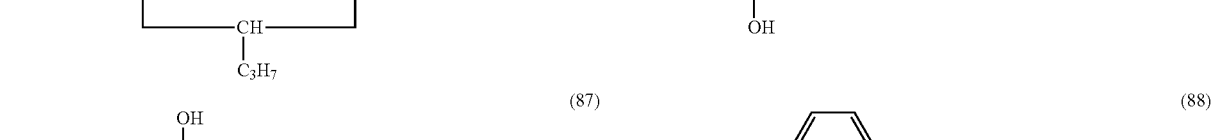 (87) (88)

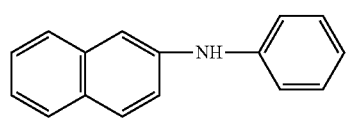
(89)
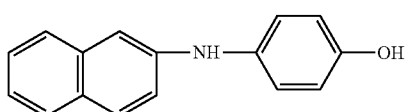
(90)
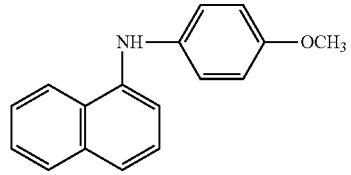
(91)
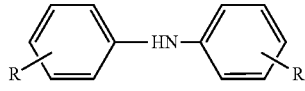
R = C₇H₁₅ ~ C₉H₁₉
(92)
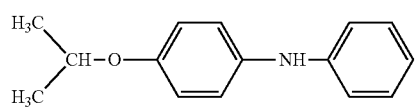
(93)
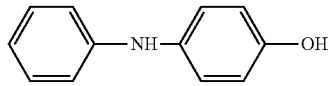
(94)
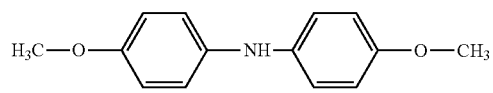
(95)
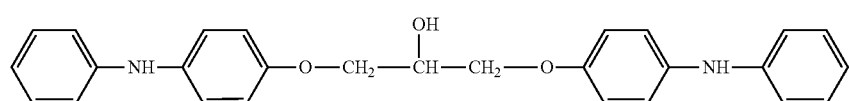
(96)
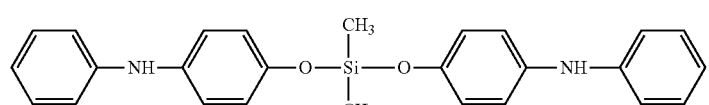
(97)
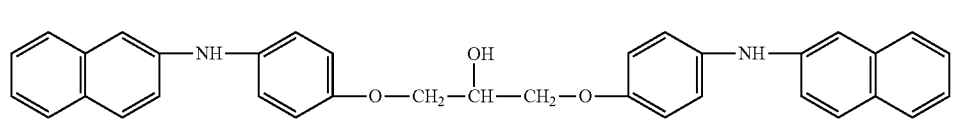
(98)
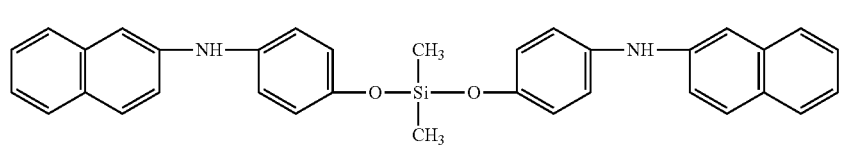
(99)
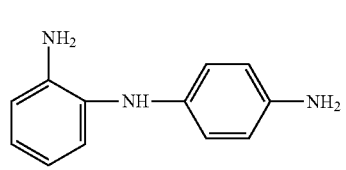
(100)
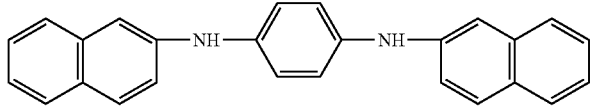
(101)
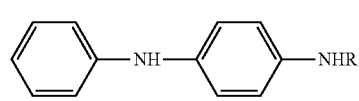
R = C₇H₁₅ ~ C₉H₁₉
(102)
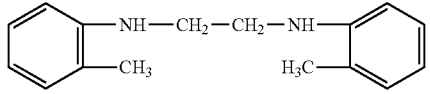
(103)
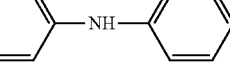
(104)
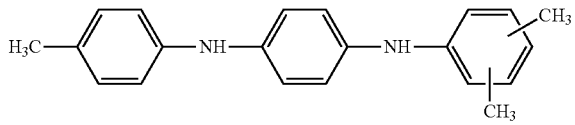
(105)
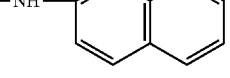
(106)
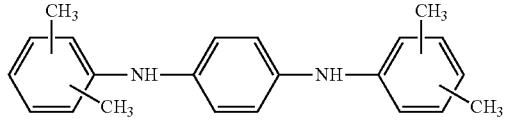
(107)

-continued
(108) 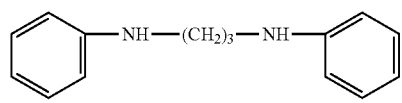
(110) 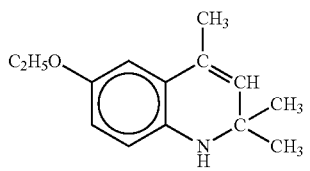
(111) 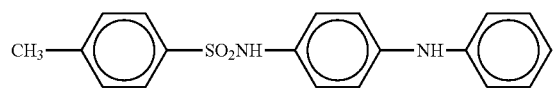
(112) 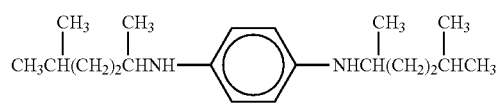
(113) 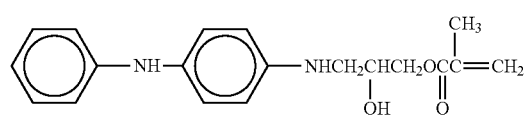
(114) 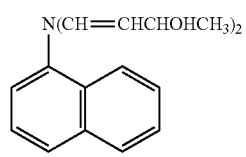
(115) 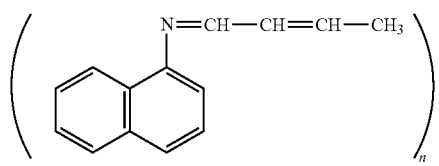
(116) H₂N—⟨phenyl⟩—CH₂—⟨phenyl⟩—NH₂
(117) 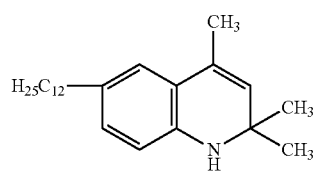
(118) 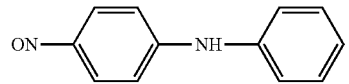
(121) 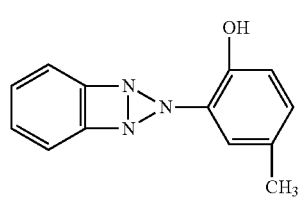
(124) 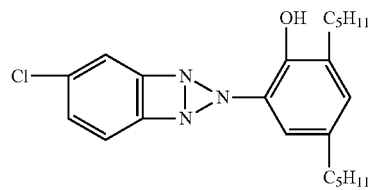
(125), (126), (127), (128), (129), (130), (131), (132) 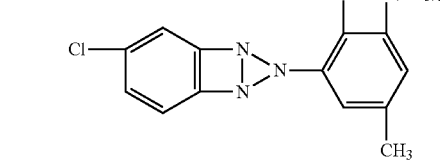

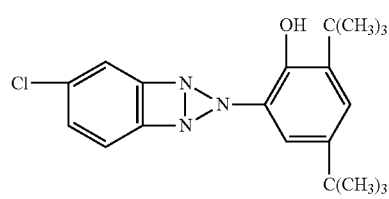
(133)
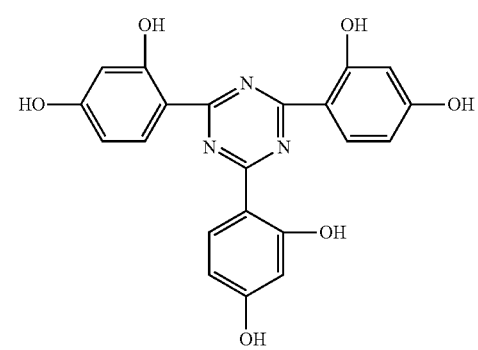
(134)
(135)
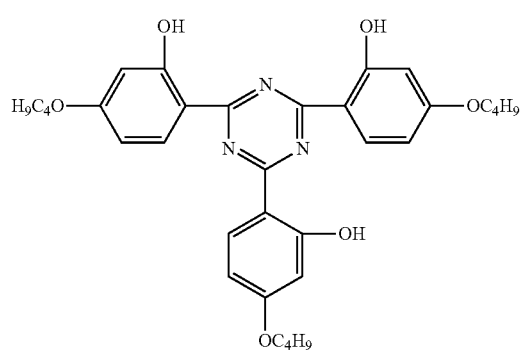
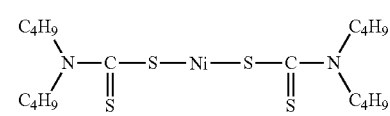
(137)
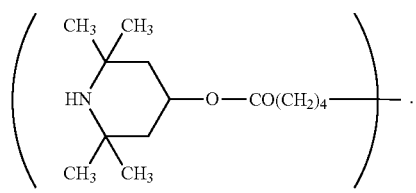
(138)
7. The nanophase carbon black of claim 1, wherein the nanophase carbon black further includes a third component; wherein the third component is a phosphate or sulfur-containing organic antioxidant compound.
\* \* \* \* \*